(12) United States Patent
Lakshminarayan et al.

(10) Patent No.: US 11,582,746 B2
(45) Date of Patent: *Feb. 14, 2023

(54) DYNAMIC, MULTI-FREQUENCY SUPERFRAME SLOTTING

(71) Applicant: Ademco Inc., Golden Valley, MN (US)

(72) Inventors: Nagaraj Lakshminarayan, Karnataka (IN); Sachin Joy, Karnataka (IN); Sheetal Kadam, Karnataka (IN)

(73) Assignee: ADEMCO INC., Golden Valley, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/219,965

(22) Filed: Apr. 1, 2021

(65) Prior Publication Data

US 2022/0322318 A1 Oct. 6, 2022

(51) Int. Cl.
*H04W 72/04* (2009.01)
*H04B 7/26* (2006.01)
(Continued)

(52) U.S. Cl.
CPC ........ *H04W 72/044* (2013.01); *H04B 7/2656* (2013.01); *H04L 12/283* (2013.01); *H04W 80/045* (2013.01); *H04L 2012/2841* (2013.01)

(58) Field of Classification Search
CPC .............. H04W 72/044; H04W 80/045; H04B 7/2656; H04L 12/283; H04L 2012/2841
See application file for complete search history.

(56) References Cited

U.S. PATENT DOCUMENTS 6,031,827 A 2/2000 Rikkinen et al.
6,690,657 B1 2/2004 Lau et al.
(Continued)

FOREIGN PATENT DOCUMENTS

CN 103596191 A 2/2014
EP 2757837 A1 7/2014
(Continued)

OTHER PUBLICATIONS

Mohamad Jaafer Ali, et al. ("Efficient Access Arbitration Among Interfering WBANs Using Latin Rectangles", ARXIV.org, Cornell University Library, Jan. 27, 2017, XP080752029, 12 pgs. (Year: 2017).*

(Continued)

*Primary Examiner* — Chae S Lee
(74) *Attorney, Agent, or Firm* — Fredrikson & Byron, P.A.

(57) ABSTRACT

An apparatus includes processing circuitry configured to output a first superframe configured in an initial superframe mode that allocates each slot of a plurality of slots for wireless communication to a first protocol at a first frequency band, a second protocol at the first frequency band, or a third protocol at the first frequency band. The processing circuitry is also configured to output a second superframe configured in a multi-frequency superframe mode that allocates: i) at least one slot of a plurality of slots for wireless communication to the first protocol, the second protocol, or the third protocol at the first frequency band, and ii) at least one slot of the plurality of slots for wireless communication to the first protocol, the second protocol, or the third protocol at the second frequency band.

16 Claims, 9 Drawing Sheets

(51) Int. Cl.
*H04L 12/28* (2006.01)
*H04W 80/04* (2009.01)
*H04W 72/044* (2023.01)

(56) References Cited

U.S. PATENT DOCUMENTS

| | | | |
|---|---|---|---|
| 8,228,859 | B2 | 7/2012 | Wang et al. |
| 8,884,774 | B2 | 11/2014 | Sanderford, Jr. |
| 9,312,976 | B2 | 4/2016 | Zhang |
| 9,565,657 | B2 | 2/2017 | Suresh et al. |
| 9,736,703 | B2 | 8/2017 | Goldsmith et al. |
| 9,814,038 | B2 | 11/2017 | Suresh et al. |
| 9,872,146 | B2 | 1/2018 | Mycek et al. |
| 9,913,232 | B2 | 3/2018 | Seo et al. |
| 9,930,641 | B2 | 3/2018 | Beema et al. |
| 9,978,237 | B2 | 5/2018 | Britt et al. |
| 10,039,052 | B2 | 7/2018 | Zhou et al. |
| 10,051,494 | B2 | 8/2018 | Rengarajan et al. |
| 10,091,786 | B2 | 10/2018 | Schmidl et al. |
| 10,129,916 | B1 | 11/2018 | Lakshminarayan |
| 10,499,405 | B2 | 12/2019 | Lee et al. |
| 10,798,539 | B2 | 10/2020 | Marschalkowski et al. |
| 10,833,754 | B2 | 11/2020 | Desclos et al. |
| 10,913,094 | B2 | 2/2021 | Li et al. |
| 2003/0137993 | A1 | 7/2003 | Odman |
| 2005/0058149 | A1 | 3/2005 | Howe |
| 2006/0068820 | A1 | 3/2006 | Sugaya et al. |
| 2007/0090996 | A1 | 4/2007 | Wang |
| 2008/0032738 | A1 | 2/2008 | Boyer et al. |
| 2009/0103488 | A1 | 4/2009 | Zhu et al. |
| 2011/0038356 | A1 | 2/2011 | Bachrach |
| 2012/0166338 | A1 | 6/2012 | Agnelli et al. |
| 2013/0320080 | A1 | 12/2013 | Olson et al. |
| 2014/0324410 | A1 | 10/2014 | Mathews et al. |
| 2014/0375428 | A1 | 12/2014 | Park |
| 2015/0108901 | A1 | 4/2015 | Greene et al. |
| 2015/0356332 | A1 | 12/2015 | Turner et al. |
| 2016/0029346 | A1 | 1/2016 | Suresh et al. |
| 2016/0044661 | A1* | 2/2016 | Suresh ............... H04W 16/16 370/337 |
| 2017/0055199 | A1 | 2/2017 | Petersen et al. |
| 2017/0223615 | A1 | 8/2017 | Lee et al. |
| 2017/0230810 | A1 | 8/2017 | Banerjea |
| 2017/0273013 | A1 | 9/2017 | Edara et al. |
| 2017/0332049 | A1 | 11/2017 | Zhang |
| 2018/0041959 | A1 | 2/2018 | Yang et al. |
| 2018/0098263 | A1* | 4/2018 | Luo ..................... H04L 1/1664 |
| 2018/0242100 | A1 | 8/2018 | Gandhi et al. |
| 2018/0242312 | A1 | 8/2018 | Gandhi et al. |
| 2018/0279208 | A1 | 9/2018 | Eskildsen et al. |
| 2018/0324607 | A1 | 11/2018 | Rengarajan et al. |
| 2019/0132836 | A1 | 5/2019 | Li et al. |
| 2019/0197838 | A1 | 6/2019 | Beema et al. |
| 2019/0199578 | A1 | 6/2019 | Lakshminarayan et al. |
| 2019/0250899 | A1 | 8/2019 | Riedl et al. |
| 2019/0281371 | A1 | 9/2019 | Klicpera |
| 2019/0281608 | A1 | 9/2019 | Huang et al. |
| 2019/0380018 | A1 | 12/2019 | Tian |
| 2020/0037252 | A1 | 1/2020 | Chiarizio et al. |
| 2020/0068578 | A1 | 2/2020 | Lee et al. |
| 2020/0267561 | A1 | 8/2020 | Lakshminarayan et al. |
| 2020/0296664 | A1 | 9/2020 | Lakshminarayan et al. |
| 2021/0201486 | A1 | 7/2021 | Takenouchi |

FOREIGN PATENT DOCUMENTS

| | | |
|---|---|---|
| EP | 3506719 A1 | 7/2019 |
| EP | 3951732 A1 | 2/2022 |
| WO | 9819400 A1 | 5/1998 |
| WO | 2016160215 A1 | 10/2016 |
| WO | 2017143320 A1 | 8/2017 |
| WO | 2020096969 A1 | 5/2020 |
| WO | 2020195379 A1 | 10/2020 |

OTHER PUBLICATIONS

IEEE 802.11, Wikipedia, The free Encyclopedia, last edit Dec. 30, 2019, accessed on Feb. 4, 2019, 15 pgs.

Mohamad Jaafer Ali, et al., "Efficient Access Arbitration Among Interfering WBANs Using Latin Rectangles", ARXIV.org, Cornell University Library, Jan. 27, 2017, XP080752029, 12 pgs.

International Search Report and Written Opinion of the International Application No. PCT/US2022/017699, dated May 25, 2022, 9 pg.

* cited by examiner

DYNAMIC, MULTI-FREQUENCY SUPERFRAME SLOTTING

TECHNICAL FIELD

This disclosure relates generally to networks, for instance, networks used in home automation, comfort, and security systems.

BACKGROUND

A home network may use a wireless network protocol to connect devices within the home. For example, a hub device may use IEEE 802.15.4 to connect to over one hundred sensor devices in a home to the hub device. The hub device may then collect sensor data collected by the sensor devices in the home. For instance, the hub device may collect door/window, or other security or home automation, sensor readings and output the door/window, or other security or home automation, sensor readings to a home security sensor or other device in the home network or, in some cases, to a remote server. In another instance, the hub device may collect temperature readings from multiple temperature sensors arranged within the home and output the temperature readings to a thermostat that controls an HVAC system using the temperature readings.

SUMMARY

In general, this disclosure relates to systems, devices, and methods for wirelessly connecting devices using multiple wireless protocols that use time-division duplexing, such as, for example, time-division multiple access (TDMA). As used herein, time-division duplexing can refer to processes that allocate each communication of multiple communications at a particular frequency (e.g., a 2.4 GHz band, a sub 1 GHz band) into a time "slot" of a repeating "superframe." In contrast, frequency-division multiplexing can assign each communication of multiple communications to a unique frequency.

Techniques described herein may improve a performance of a network. For example, a hub device that performs dynamic superframe slotting at different frequency bands may more efficiently allocate slots to sensor devices using different bands to wirelessly communicate with the hub device. This can result since the dynamic introduction of a slot at a second, different frequency band in a single superframe can be executed on an as needed basis, which can improve bandwidth allocation in the home network and, thus, can increase a reliability of the home network. Furthermore, this introduction of a slot at a second, different frequency band in a single superframe can help sensor devices in the same home network (e.g., the same local, personal area network) communicate more reliability with increased wireless range, for instance, where the dynamically introduced slot at the second, different frequency band in the single superframe is at a sub 1 GHz frequency band. As such, the ability to operate in the multi-frequency mode can allow the hub device to support, via a single superframe, sensor devices operating at different frequency bands, and, in some cases, operating at different protocols at the different frequency bands.

For example, processing circuitry can allocate each slot according to a superframe mode. For example, a hub device may use an initial superframe mode that allocates a particular slot for wireless communication to a particular protocol (e.g., IEEE 802.15.4). For instance, the hub device may output a first, initial superframe in an initial superframe mode that allocates each slot of a plurality of slots for wireless communication to various, different protocols (e.g., IEEE 802.15.4 and/or BLUETOOTH) at a first frequency band (e.g., 2.4 GHz). In this example, the hub device can use a multi-frequency superframe mode that allocates the at least one slot of a plurality of slots for wireless communication to one of the various, different protocols (e.g., IEEE 802.15.4 and/or BLUETOOTH) at the first frequency band (e.g., 2.4 GHz) and at least one slot of the plurality of slots for wireless communication to one of the various, different protocols (e.g., IEEE 802.15.4 and/or BLUETOOTH) at a second frequency band (e.g., sub 1 GHz) that is different than the first frequency band. In this way, the hub device may dynamically assign slots of a single superframe based on the frequency band to be used by the sensor device(s) to transmit data to and from the hub device. As such, in a multi-frequency superframe mode, a single superframe can dynamically be generated to include one slot for wireless communication at one frequency band and another slot for wireless communication at another, different frequency band.

Continuing from the above example, in some instances a single radio chip can be utilized to carry out the multi-frequency superframe mode via a single superframe. As a result, a single superframe including both a slot at the first frequency band and another slot at the second, different frequency band can allow a sensor device that has the ability to wirelessly communicate, via different radios, at both the first and second frequency bands to switch between these frequency bands to communicate with the hub device using a single identification (e.g., a single PAN ID). Moreover, the ability to dynamically introduce the second, different frequency band slot in the single superframe having the first frequency band slot and shift the time location of the second, different frequency band slot within the single superframe can allow for the optimization of bandwidth allocation within the single superframe and, thereby, can reduce traffic, and resulting jamming, on the first frequency band.

One embodiment includes an apparatus for communication with a plurality of devices using time divisional multiple access (TDMA). This apparatus embodiment includes processing circuitry configured to output, to the plurality of devices, a first superframe configured in an initial superframe mode. The initial superframe mode allocates each slot of a plurality of slots for wireless communication to a first protocol at a first frequency band, a second protocol at the first frequency band, or a third protocol at the first frequency band. The first protocol, the second protocol, and the third protocol are different from each other. The processing circuitry of this apparatus embodiment is also configured to output, to the plurality of devices, a second superframe configured in a multi-frequency superframe mode. The multi-frequency superframe mode allocates: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at a second frequency band, the second protocol at the second frequency band, or the third protocol at the second frequency band. The second frequency band is different than the first frequency band.

In a further embodiment of the apparatus, to output the first superframe, the processing circuitry is configured to output a beacon indicating a starting of the first superframe and indicating a group number assigned to each device of the plurality of devices. And, in this further embodiment, to output the second superframe, the processing circuitry is configured to output a second beacon indicating a starting of the second superframe and indicating the group number assigned to each device of the plurality of devices.

In a further embodiment of the apparatus, the processing circuitry is further configured to determine a presence of a device of the plurality of devices capable of wireless communication using the second frequency band, and, in response to determining the presence of the device of the plurality of devices capable of wireless communication using the second frequency band, output, to the plurality of devices, the second superframe configured in the multi-frequency superframe mode.

In one such example of this further embodiment of the apparatus, the processing circuitry is configured to determine the presence of the device of the plurality of devices capable of wireless communication using the second frequency band via a second frequency band notification received from the device of the plurality of devices capable of wireless communication using the second frequency band. For instance, the second frequency band notification can be received from the device of the plurality of devices capable of wireless communication using the second frequency band via a slot of the plurality of slots of the initial superframe using one of the first protocol at the first frequency band, the second protocol at the first frequency band, or the third protocol at the first frequency band.

In another such example of this further embodiment of the apparatus, the processing circuitry is configured to receive a data size notification from the device of the plurality of devices capable of wireless communication using the second frequency band, and, in response to receiving the data size notification, determine a bandwidth, corresponding to the data size notification, of the at least one slot of the plurality of slots for wireless communication allocated in the multi-frequency superframe mode to the first protocol at the second frequency band, the second protocol at the second frequency band, or the third protocol at the second frequency band. For instance, the data size notification can include an indication as to whether the device of the plurality of devices capable of wireless communication using the second frequency band is to output video and/or audio content. In another instance, in response to determining the bandwidth of the at least one slot of the plurality of slots for wireless communication allocated in the multi-frequency superframe mode to the first protocol at the second frequency band, the second protocol at the second frequency band, or the third protocol at the second frequency band, the processing circuitry is further configured to reduce a bandwidth of at least one of the slot of the plurality of slots for wireless communication allocated in the multi-frequency superframe mode to the first protocol at the first frequency, the slot of the plurality of slots for wireless communication allocated in the multi-frequency superframe mode to the second protocol at the first frequency band, and the slot of the plurality of slots for wireless communication allocated in the multi-frequency superframe mode to the third protocol at the first frequency. In one such case, the processing circuitry can be configured to reduce the bandwidth of at least one of the slot of the plurality of slots for wireless communication allocated in the multi-frequency superframe mode to the first protocol at the first frequency, the slot of the plurality of slots for wireless communication allocated in the multi-frequency superframe mode to the second protocol at the first frequency band, and the slot of the plurality of slots for wireless communication allocated in the multi-frequency superframe mode to the third protocol at the first frequency by an extent corresponding to the bandwidth determined corresponding to the data size notification.

In a further embodiment of the apparatus, the first protocol includes a local area networking protocol, the second protocol includes a low-power wireless connection protocol, and the third protocol includes a high-bandwidth connection protocol. In one such example, the first protocol includes Wi-Fi, the second protocol includes IEEE 802.15.4, and the third protocol includes BLUETOOTH.

In a further embodiment of the apparatus, the first frequency band is a 2.4 GHz band, and the second frequency band is a sub 1 GHz band.

Another embodiment includes a method. This method embodiment includes the step of outputting, by processing circuitry, to a plurality of devices, a first superframe configured in an initial superframe mode. The initial superframe mode allocates each slot of a plurality of slots for wireless communication to a first protocol at a first frequency band, a second protocol at the first frequency band, or a third protocol at the first frequency band. The first protocol, the second protocol, and the third protocol are different from each other. This method embodiment also includes the step of outputting, by processing circuitry, to the plurality of devices, a second superframe configured in a multi-frequency superframe mode. The multi-frequency superframe mode allocates: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at a second frequency band, the second protocol at the second frequency band, or the third protocol at the second frequency band. The second frequency band is different than the first frequency band.

In a further embodiment of the method, outputting the first superframe includes outputting, by the processing circuitry, a beacon indicating a starting of the first superframe and indicating a group number assigned to each device of the plurality of devices. And, outputting the second superframe includes outputting, by the processing circuitry, a second beacon indicating a starting of the second superframe and indicating the group number assigned to each device of the plurality of devices.

In a further embodiment of the method, the method also includes the step of determining, by the processing circuitry, a presence of a device of the plurality of devices capable of wireless communication using the second frequency band. And, in response to determining the presence of the device of the plurality of devices capable of wireless communication using the second frequency band, outputting, by the processing circuitry, to the plurality of devices, the second superframe configured in the multi-frequency superframe mode. As one example, determining, by the processing circuitry, the presence of the device of the plurality of devices capable of wireless communication using the second frequency band includes using a second frequency band notification received from the device of the plurality of devices capable of wireless communication using the second frequency band. For instance, the second frequency band notification can be received from the device of the plurality of devices capable of wireless communication using the second frequency band via a slot of the plurality of slots of the initial superframe using one of the first protocol at the first frequency band, the second protocol at the first frequency band, or the third protocol at the first frequency band.

An additional embodiment includes a system. This system embodiment includes a plurality of sensor devices and a hub device in communication with the plurality of sensor devices using time divisional multiple access (TDMA). The hub device includes processing circuitry configured to output, to the plurality of sensor devices, a first superframe configured in an initial superframe mode. The initial superframe mode allocates each slot of a plurality of slots for wireless communication to a first protocol at a first frequency band, a second protocol at the first frequency band, or a third protocol at the first frequency band. The first protocol, the second protocol, and the third protocol are different from each other. And, hub device's processing circuitry is configured to output, to the plurality of sensor devices, a second superframe configured in a multi-frequency superframe mode. The multi-frequency superframe mode allocates: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at a second frequency band, the second protocol at the second frequency band, or the third protocol at the second frequency band. The second frequency band is different than the first frequency band.

In a further embodiment of the system, to output the first superframe, the processing circuitry is configured to output a beacon indicating a starting of the first superframe and indicating a group number assigned to each device of the plurality of devices. And, to output the second superframe, the processing circuitry is configured to output a second beacon indicating a starting of the second superframe and indicating the group number assigned to each device of the plurality of devices.

In a further embodiment of the system, the processing circuitry is further configured to determine a presence of a device of the plurality of devices capable of wireless communication using the second frequency band. And, in response to determining the presence of the device of the plurality of devices capable of wireless communication using the second frequency band, the processing circuitry is further configured to output, to the plurality of devices, the second superframe configured in the multi-frequency superframe mode.

The details of one or more examples are set forth in the accompanying drawings and the description below. Other features, objects, and advantages will be apparent from the description and drawings, and from the claims.

BRIEF DESCRIPTION OF DRAWINGS

The following drawings are illustrative of particular examples of the present invention and therefore do not limit the scope of the invention. The drawings are not necessarily to scale, though embodiments can include the scale illustrated, and are intended for use in conjunction with the explanations in the following detailed description wherein like reference characters denote like elements. Examples of the present invention will hereinafter be described in conjunction with the appended drawings.

DETAILED DESCRIPTION

Figure 1A:
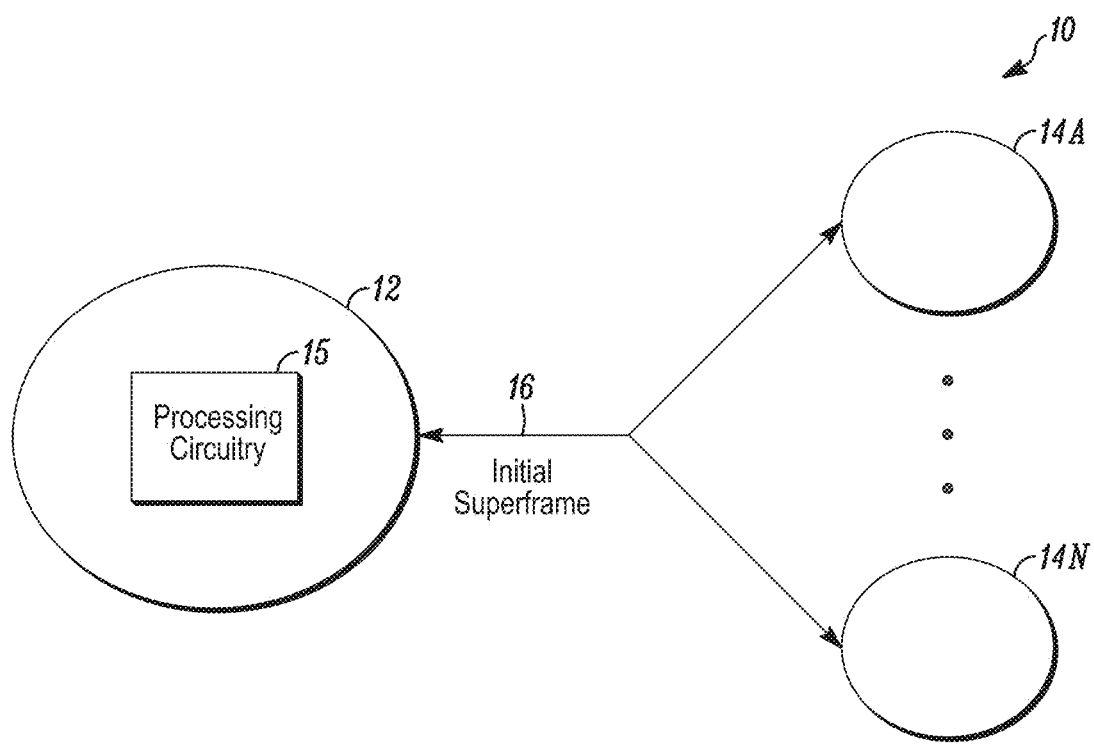
FIG. 1A is a conceptual diagram illustrating devices in communication using an initial superframe mode, in accordance with some examples of this disclosure.

The following detailed description is exemplary in nature and is not intended to limit the scope, applicability, or configuration of the invention in any way. Rather, the following description provides some practical illustrations for implementing examples of the present invention. Those skilled in the art will recognize that many of the noted examples have a variety of suitable alternatives.

Modern residential buildings or other buildings may include a central "hub" device configured to manage one or more systems within the building, such as monitoring systems, comfort systems, security systems, and/or home automation systems. The hub device can be in wireless communication with a number of other devices placed throughout the building. For example, the hub device may wirelessly receive sensor data from any number of different sensor devices, such as motion sensors, air quality and/or temperature sensors, infrared sensors, door and/or window contact sensors, switches, and/or other sensor devices. Additionally, the hub device may wirelessly transmit commands or instructions to one or more controllable sensor devices. For example, the hub device may instruct a thermostat to adjust a temperature within the building, or in another example, may command a damper to open or close an air vent.

In some applications for managing one or more systems within a building, BLUETOOTH radio communication techniques may have an advantage over other radio connection techniques such as, for example, IEEE 802.15.4 radio communication techniques. For instance, BLUETOOTH radio communications techniques may support high data rates and throughput compared to IEEE 802.15.4 radio communication techniques. For example, BLUETOOTH may have a bandwidth of greater than 500 kilobits-per-second (kbps) (e.g., 1 Mbps) and IEEE 802.15.4 may have a bandwidth of less than 500 kbps (e.g., 250 kbps). From a range perspective, BLUETOOTH radio techniques and IEEE 802.15.4 radio communication techniques may have nearly equal link budget. BLUETOOTH may have a range of greater than 80 meters (e.g., 100 meters) and IEEE 802.15.4 may have a range of less than 80 meters (e.g., 70 meters). In some examples, BLUETOOTH may have a join time (e.g., latency) of greater than 1 second (e.g., 3 seconds) and IEEE 802.15.4 may have a join time of less than 1 second (e.g., 30 milliseconds (ms)). BLUETOOTH may have a stack size of greater than 100 kb (e.g., 250 kb) and IEEE 802.15.4 may have a stack size of less than 100 kb (e.g., 28 ms). In some examples, IEEE 802.11, also referred to herein as simply "Wi-Fi™," may offer even higher data rates than BLUETOOTH but with a higher energy cost.

As used herein, BLUETOOTH may refer to present and future versions of BLUETOOTH. Examples of BLUETOOTH include classic BLUETOOTH (e.g., Versions 1.0, 1.0B, 1.1, 1.2, 2.0, 2.1, 3.0, 4.0, 4.1, 4.2, 5, 5.1, etc.), BLUETOOTH-low energy (e.g., Versions 4.0, 4.1, 4.2, 5, 5.1, etc.), and other types of BLUETOOTH. As such, all instances of "BLUETOOTH" herein should be interpreted as including classic BLUETOOTH and/or BLUETOOTH-low energy. BLUETOOTH may operate at frequencies between 2.402 and 2.480 GHz, 2.400 and 2.4835 GHz including a 2 MHz wide guard band and a 3.5 MHz wide guard band, or another frequency range. In some examples, each frequency channel of the BLUETOOTH channel may have a center frequency different from a central frequency of a neighboring channel by less than 1 MHz. In some examples, each frequency channel of a wireless channel (e.g., an IEEE 802.15.4 channel) may have a center frequency different from a central frequency of a neighboring channel by greater than 1 MHz (e.g., 2 MHz, 5 MHz, etc.).

In some cases, BLUETOOTH can refer to communications that use frequency hopping, such as, for example, frequency-hopping spread spectrum, to avoid interference from other radio communications. For example, a device using a BLUETOOTH channel may operate a BLUETOOTH channel that hops between 37 frequency channels when using advertising channels and 40 frequency channels when operating without advertising channels. In contrast, IEEE 802.15.4 may instead use a direct sequence spread spectrum technique. For example, a device may establish a wireless channel using IEEE 802.15.4 by mixing a signal for the wireless channel with a pseudo-random code which is then extracted by a receiver from an external device. Direct sequence spread spectrum may help to enhance the signal-to-noise ratio by spreading the transmitted signal across a wide band. In some examples, a device establishing a wireless channel using IEEE 802.15.4 may be configured to scan for a clear spectrum.

Smart home devices may deploy many different wireless protocols to address the needs to the smart home. There are standards based protocols (Wi-Fi™, Zigbee™, Thread™, Zwave™, BLUETOOTH, DECT™, etc.) and proprietary, manufacture specific protocols. The issue with this array of protocols is that each protocol is tuned to a specific application. For example, Wi-Fi™ may be particularly useful for high bandwidth data applications that do not require long battery life. Zigbee™ may be particularly useful for low bandwidth data applications to maximize battery life. Additionally, not every wireless protocol is globally compliant. For example, Zwave™ may have different hardware designs for various operational regions.

Smart home systems may include a collection of different networks that operate at a common frequency suitable for home networks. For example, a Wi-Fi™ network of a smart home system, a BLUETOOTH network of the smart home system, and an IEEE 802.15.4 network of the smart home system may each operate at a 2.4 GHz frequency. A hub device may allocate each device to a time slot, also referred to herein as simply "slot," of the superframe during a registration process. For example, the hub device may allocate a Wi-Fi™ slot to one or more first devices, a BLUETOOTH slot to one or more second devices, and an IEEE 802.15.4 slot to one or more third devices. In this example, the hub device may output the superframe using a beacon that specifies a beginning of the superframe. All devices of the network may synchronize to the beacon and output data at the 2.4 GHz frequency according to the allocated slots of the superframe. For instance, the one or more first devices output data in accordance with the Wi-Fi™ protocol during the Wi-Fi™ slot, the one or more second devices output data in accordance with the BLUETOOTH protocol during the BLUETOOTH slot, and the one or more third devices output data in accordance with the IEEE 802.15.4 protocol during the 802.15.4 slot.

In accordance with the techniques of the disclosure, rather than using a fixed superframe mode, the hub device may dynamically adjust a superframe. For example, the hub device may be configured to use an initial, first superframe mode, at a first frequency band, for communication with devices operating at that first frequency band and configured to use a second, multi-frequency superframe mode that includes both the first frequency band and a second, different frequency band in the same, single superframe for communication, via the singe superframe, with both devices operating at the first and second frequency bands. Moreover, the hub device can additionally dynamically adjust the superframe to adjust and/or introduce various slots, at various time locations, in the single superframe to better allocate the bandwidth of the single superframe as suited for the devices with which the hub device communicates in the network. A hub device that dynamically adjusts a superframe mode may increase a bandwidth of the network compared to hub devices that use a fixed superframe mode.

FIG. 1A is a conceptual diagram illustrating devices in communication using an initial superframe mode, in accordance with some examples of this disclosure. In some examples, the initial superframe mode is a time divisional multiple access (TDMA) superframe mode. While system 10 illustrates only hub device 12 and sensor devices 14A-14N (collectively, "sensor devices 14" or simply "devices 14"), system 10 may include additional devices (e.g., devices in wireless communication with each other) or fewer devices. System 10 may be installed within a building and the surrounding premises (collectively, "premise").

Hub device 12 may include a computing device configured to operate one or more systems within a building, such as comfort, security, safety, and/or home automation systems. For example, as described further below, hub device 12 may include processing circuitry 15 configured to receive data, such as received from one or more devices and/or from user input, and process the data in order to automate one or more systems within a building. For example, hub device 12 may automate, control, or otherwise manage systems including heating and cooling, ventilation, illumination, or authorized access to individual rooms or other regions, as non-limiting examples. For example, hub device 12 may include a "Life and Property Safety Hub®" of Resideo Technologies, Inc.®, of Austin, Tex. Hub device 12 may include a wired connection to an electric power grid, but in some examples may include an internal power source, such as a battery, supercapacitor, or another internal power source.

Sensor devices 14 may be configured to enroll with hub device 12. For example, sensor device 14 may be configured to exchange sensor data with hub device 12 and/or be controlled by hub device 12. Sensor devices 14 may be configured to collect or generate sensor data and transmit the sensor data to hub device 12 for processing. In some examples, sensor device 14 may include a controllable device. A controllable device may be configured to perform a specified function when the controllable device receives instructions (e.g., a command or other programming) to perform the function from hub device 12. Examples of different types of sensor devices 14 are included in the description of FIG. 2. Sensor devices 14 may include either a wired connection to an electric power grid or an internal power source, such as a battery, supercapacitor, or another internal power source.

Processing circuitry 15 may be configured to communicate with sensor devices 14 using one or more wireless communication protocols and one or more frequency bands (e.g., two different frequency bands). Examples of wireless communication protocols may include, but not limited to, a low-power wireless connection protocol, a high-bandwidth connection protocol, or a local area networking protocol. Examples of a low-power connection protocol may include, but are not limited to, IEEE 802.15.4, a low power protocol using a 900 MHz frequency band, or another low-power connection protocol. As used herein, IEEE 802.15.4 may include any standard or specification compliant with IEEE 802.15.4, such, as for example, Zigbee™, ISA100.11a™, WirelessHART™, MiWi™, 6LoWPAN™, Thread™, SNAP™, and other standards or specifications that are compliant with IEEE 802.15.4. That is, for example, IEEE 802.15.4 should be interpreted herein as including implementations relying only on the IEEE 802.15.4 standard as well as implementations that build upon the IEEE 802.15.4 standard with additional specifications, such as, for example, Zigbee™. Examples of a high-bandwidth connection protocol may include, for example, BLUETOOTH (e.g., classic BLUETOOTH, BLUETOOTH low energy, etc.). Examples of a local area networking protocol may include, for example, Wi-Fi™ (e.g., IEEE 802.11 a/b/g/n/ac, etc.).

Although FIG. 1A shows hub device 12 as directly connected to sensor devices 14, in some examples, system 10 may include one or more repeater nodes that are each configured to act as an intermediary or "repeater" device. For example, sensor device 14A may output first data in accordance with Wi-Fi™ to a first repeater device, which outputs the first data to hub device 12. In this example, sensor device 14B may output second data in accordance with BLUETOOTH to a second repeater device, which outputs the second data to hub device 12. The first repeater device and the second repeater device may be the same device (e.g., a device configured to communicate in accordance with BLUETOOTH and in accordance with Wi-Fi™) or may be separate devices.

Processing circuitry 15 may be configured to use TDMA for communication in system 10. For example, a Wi-Fi™ network of a smart home system, a BLUETOOTH network of the smart home system, and an IEEE 802.15.4 network of the smart home system may operate at a 2.4 GHz frequency (e.g., within a band of frequencies comprising 2.4 GHz). In this example, processing circuitry 15 may register each of devices 14 to a slot of a superframe. For example, processing circuitry 15 may allocate sensor device 14A to a first slot of a superframe 16, also referred to herein as simply "superframe 16," for a group of devices and allocate sensor device 14N to a second slot of superframe 16 for a group of devices. Processing circuitry 15 may "output" superframe 16 by outputting a beacon signaling the beginning of the superframe. Each one of sensor devices 14 may synchronize with the beacon and output data according to the slots defined by the superframe. In some examples, processing circuitry 15 may periodically output superframe 16 to allow sensor devices 14 to output data.

Hub device 12 may allocate multiple devices to a single slot of a superframe, but possibly at different portions of the single slot. For example, hub device 12 may allocate sensor device 14A to a first 4 ms portion of an IEEE 802.15.4 slot and allocate sensor device 14N to a second 4 ms portion of the IEEE 802.15.4 slot that is different from the first 4 ms portion of the IEEE 802.15.4 slot. In some examples, hub device 12 may allocate sensor device 14A to a first channel (e.g., 2.402 GHz) of a BLUETOOTH slot and allocate sensor device 14N to a second channel (e.g., 2.479 GHz) of the BLUETOOTH slot that is different from the first channel.

Processing circuitry 15 may use multiple superframes and/or a single superframe with slots allocated to device communication at different frequency bands. For example, processing circuitry 15 may allocate sensor device 14A to a slot of a first superframe for a first group of devices and allocate sensor device 14N to a slot of a second superframe for a second group of devices. Processing circuitry 15 may output the first superframe by outputting a first beacon signaling the beginning of the first superframe. In response to the first beacon, sensor device 14A may output data according to the slots defined by the first superframe while sensor device 14N refrains from outputting data during the first superframe. In this example, processing output the second superframe by outputting a second beacon signaling the beginning of the second superframe. In response to the second superframe, sensor device 14A may refrain from outputting data and sensor device 14B may output data according to the slots defined by the second superframe. Processing circuitry 15 may periodically output the first superframe and the second superframe to allow sensor devices 14 to output data.

In some systems, a hub device may use a single superframe mode for each superframe. For example, the hub device may allocate time for Wi-Fi™ and IEEE 802.15.4 communication when a system has video data to communicate over BLUETOOTH. In this example, maintaining the time allocated to Wi-Fi™ and/or IEEE 802.15.4 may reduce a bandwidth of the network compared to systems that dynamically increase an amount of time for BLUETOOTH communication when a system has video data to communicate over BLUETOOTH.

Rather than using a single superframe mode, hub device 12 may be configured to use multiple superframe modes, each superframe mode allocating each slot of a plurality of slots for wireless communication to a first protocol, a second protocol, or a third protocol. In some examples, the first protocol, the second protocol, and the third protocol are different from each other. For example, the first protocol may include a local area networking protocol, the second protocol may include a low-power wireless connection protocol, and/or the third protocol may include a high-bandwidth connection protocol. For instance, the first protocol may include Wi-Fi™. In some examples, the second protocol may include IEEE 802.15.4. The third protocol may include BLUETOOTH.

For example, hub device 12 may be configured to use a comfort normal superframe mode that supports 64 devices with 4 ms alarm slots. In some examples, hub device 12 may be configured to use a comfort BLUETOOTH pairing superframe mode that allocates extra time (e.g., 40 ms) for BLUETOOTH pairing. In some examples, hub device 12 may be configured to use a mutually exclusive comfort BLUETOOTH pairing superframe mode that allocates extra time (e.g., 72 ms) for BLUETOOTH pairing. In some examples, hub device 12 may be configured to use a BLUETOOTH high bandwidth superframe mode that allocates extra time (e.g., 40 ms) for BLUETOOTH communications. In some examples, hub device 12 may be configured to use a Wi-Fi™ pairing superframe mode that allocates extra time (e.g., 101 ms) for Wi-Fi™ communications. In some examples, hub device 12 may be configured to use a security normal superframe mode that supports 128 devices with 2 ms alarm slots. In some examples, hub device 12 may be configured to use a security BLUETOOTH pairing superframe mode that allocates extra time for BLUETOOTH pairing. Hub device 12 may be configured to use any number of superframe modes (e.g., 6, more than 6, etc.). The foregoing examples of superframe modes are for example purposes only. For example, hub device 12 may additionally or alternatively use other superframe modes. For instance, the hub device 12 can use an initial super frame mode that allocates slots for device communication at only a first frequency band, and the hub device 12 can use a multi-frequency superframe mode that allocates slots for devices communication at each of the first frequency band and a second, different frequency band.

In accordance with the techniques of the disclosure, processing device 15 may output initial superframe 16 configured in an initial superframe mode. For example, processing circuitry 15 may output the initial superframe 16 by outputting a first beacon signaling the beginning of the initial superframe 16. In response to the first beacon, sensor device 14A may output data according to the slots defined by initial superframe 16 and sensor device 14B may output data according to the slots defined by initial superframe 16. Initial superframe 16 may be in any superframe mode. For example, initial superframe 16 may be a comfort normal superframe mode that supports 64 devices with 4 ms alarm slots. As another example, initial superframe 16 may have slots at the first frequency band, such as slots at only the first frequency band.

Figure 1B:
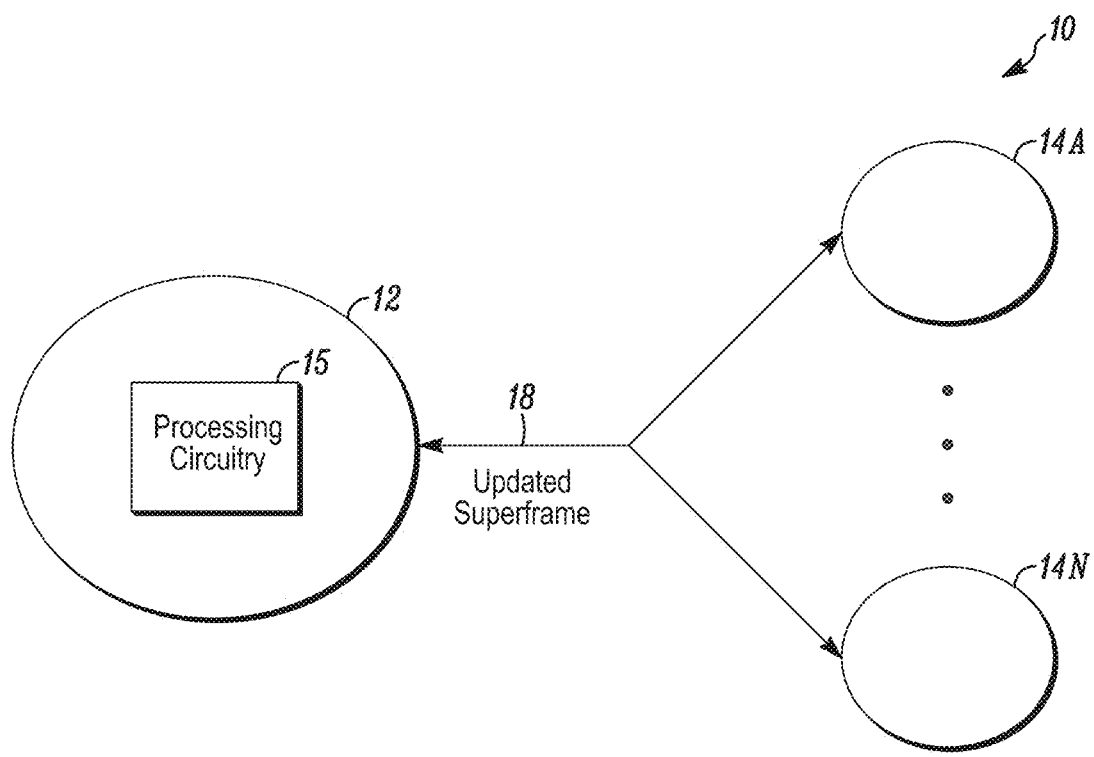
FIG. 1B is a conceptual diagram illustrating devices in communication using an updated superframe mode (e.g., a multi-frequency superframe mode), in accordance with some examples of this disclosure.

FIG. 1B is a conceptual diagram illustrating devices in communication using an updated superframe mode, in accordance with some examples of this disclosure. In examples within the scope of this disclosure, the updated superframe mode can be, for instance, a multi-frequency superframe mode. Processing circuitry 15 may determine a change in bandwidth allocated in initial superframe 16 and/or a device 14 configured to wirelessly communicate with the hub device 12 at a second, different frequency band for which a slot was not allocated in the initial superframe 16. For example, in response to a BLUETOOTH pairing request, processing circuitry 15 may determine to change bandwidth allocated to one or more of the first protocol, the second protocol, or the third protocol in initial superframe 16. For instance, processing circuitry 15 may determine to increase bandwidth allocated to BLUETOOTH communication compared to an amount of bandwidth allocated to BLUETOOTH communication in initial superframe 16. In response to determining a change in bandwidth allocated to one or more of the first protocol, the second protocol, or the third protocol, processing circuitry 15 may select an updated superframe mode 18 from that is different from the initial superframe mode of initial superframe 16. For example, processing circuitry 15 may have outputted initial superframe 16 in a comfort normal superframe mode. In this example, processing circuitry 15 may select the comfort BLUETOOTH pairing superframe mode. Processing circuitry 15 outputs an updated superframe 18 configured for the updated superframe mode. For example, processing circuitry 15 may output updated superframe 18 in the comfort BLUETOOTH pairing superframe mode.

As another example, processing circuitry 15 may determine a presence of a device 14 capable of wireless communication using a second, different frequency band that was not allocated a slot in the initial superframe 16. In response to determining the presence of the device 14 of the plurality of devices capable of wireless communication using the second frequency band, the processing circuitry 15 may be configured to output, to the plurality of devices, the second, updated superframe 18 configured in the multi-frequency superframe mode. The second, updated superframe 18, configured in the multi-frequency superframe mode, can allocate at least one slot for wireless communication to the first, second, or third protocol at the first frequency band (e.g., included in the initial superframe 16) and at least one slot for wireless communication to the first, second, of third protocol at the second, different frequency band (e.g., not included in the initial superframe 16).

Figure 2:
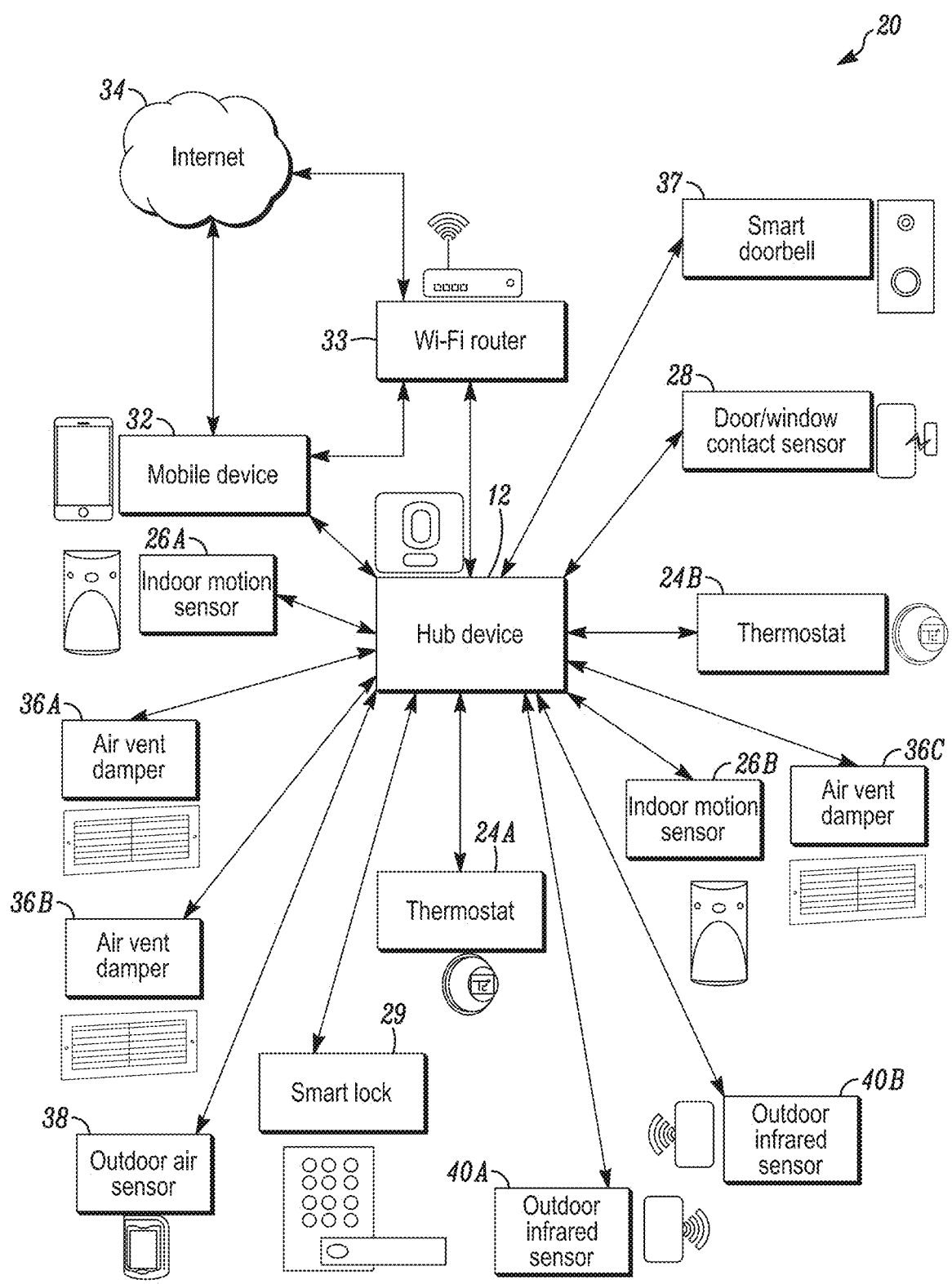
FIG. 2 is a conceptual block diagram illustrating an example of a home network, in accordance with some examples of this disclosure.

FIG. 2 is a conceptual block diagram illustrating a networked system 20, which may be one example of the networked system 10 of FIG. 1, in accordance with some examples of this disclosure. System 20 includes hub device 12, thermostat 24A, thermostat 24B (collectively, thermostats 24), indoor motion sensor 26A, outdoor motion sensor 26B (collectively, motion sensors 26), door/window contact sensor 28, air vent damper 36A, 36B, 36C (collectively, air vent dampers 36), smart doorbell 37, outdoor air sensor 38, outdoor infrared sensor 40A, indoor infrared sensor 40B (collectively, infrared sensors 40), router 33, and mobile device 32. Hub device 12 and one or more of the devices in the networked system 20 can communicate using a first frequency band (e.g., 2.4 GHz) and/or a second, different frequency band (e.g., sub 1 GHz). For example, at least one device in the networked system 20 can communicate with hub device 12 using the first frequency band while at least one other device in the networked system 20 can communicate with hub device 12 using the second, different frequency band. In another example, at least one device in the networked system 20 can selectively communication with hub device 12 using one of the first frequency band and the second, different frequency band as selected for a specific superframe. While hub device 12 is shown as a distinct component, hub device 12 may be integrated into one or more of thermostats 24, motion sensors 26, door/window contact sensor 28, air vent dampers 36, smart doorbell 37, outdoor air sensor 38, and infrared sensors 40. The various devices of system 20 are for example purposes only. For example, additional devices may be added to system 20 and/or one or more devices of system 20 may be omitted.

The system 20 is a non-limiting example of the techniques of this disclosure. Other example systems may include more, fewer, or different components and/or devices. While FIG. 2 illustrates a mobile phone, mobile device 32 may, in some examples, include a tablet computer, a laptop or personal computer, a smart watch, a wireless network-enabled key fob, an e-readers, or another mobile device. Mobile device 32 and/or router 33 may be connected to a wide area network, such as, for example, internet 34. Internet 34 may represent a connection to the Internet via any suitable interface, such as, for example, a digital subscriber line (DSL), dial-up access, cable internet access, fiber-optic access, wireless broadband access, hybrid access networks, or other interfaces. Examples of wireless broadband access may include, for example, satellite access, WiMax™, cellular (e.g., 1X, 2G, 3G™, 4G™, 5G™, etc.), or another wireless broadband access.

Central hub device 12 may be in wireless data communication with thermostats 24, motion sensors 26, door/window contact sensor 28, air vent dampers 36, smart doorbell 37, outdoor air sensor 38, and infrared sensors 40. For example, thermostats 24, motion sensors 26, door/window contact sensor 28, air vent dampers 36, smart doorbell 37, outdoor air sensor 38, and infrared sensors 40 may be directly connected to hub device 12 using one or more wireless channels according to a connection protocol, such as, but not limited to, for example, IEEE 802.15.4, BLUETOOTH, or another connection protocol.

Each of thermostats 24, motion sensors 26, door/window contact sensor 28, air vent dampers 36, smart doorbell 37, outdoor air sensor 38, and infrared sensors 40 may include either a sensor device (e.g., a device configured to collect and/or generate sensor data), a controllable device, or both, as described herein. For example, thermostats 24 may include comfort devices having sensors, such as a thermometer configured to measure an air temperature. In some examples, air vent dampers 36 may include devices located within an air vent or air duct, configured to either open or close the shutters of an air vent in response to receiving instructions from hub device 12.

Although not shown in the example of FIG. 2, central hub device 12 may be in indirect wireless data communication (e.g., communication via a repeater node) with one or more of thermostats 24, motion sensors 26, door/window contact sensor 28, air vent dampers 36, smart doorbell 37, outdoor air sensor 38, and infrared sensors 40. For example, outdoor air sensor 38 may be indirectly connected thermostat to hub device 12 using a wireless channel according to a connection protocol, such as, but not limited to, for example, IEEE 802.15.4, BLUETOOTH, or another connection protocol. For instance, outdoor air sensor 38 may be connected to hub device 12 via thermostat 24A, outdoor infrared sensor 40A may be connected to hub device 12 via outdoor motion sensor 26B, etc.

Thermostats 24 may be configured to wirelessly transmit the temperature (e.g., sensor data) directly to hub device 12. Additionally, thermostats 24 may include controllable devices, in that they may activate or deactivate a heating, cooling, or ventilation system in response to receiving instructions from hub device 12. For example, thermostat 24A may collect temperature data and transmit the data to hub device 12. Hub device 12, in response to receiving the temperature data, may determine that a respective room is either too hot or too cold based on the temperature data, and transmit a command to thermostat 24A to activate a heating or cooling system as appropriate. In this example, each of thermostats 24 may include both sensor devices and controllable devices within a single distinct unit.

Indoor and outdoor motion sensors 26 may include security devices configured to detect the presence of a nearby mobile object based on detecting a signal, such as an electromagnetic signal, an acoustic signal, a magnetic signal, a vibration, or other signal. The detected signal may or may not be a reflection of a signal transmitted by the same device. In response to detecting the respective signal, motion sensors 26 may generate sensor data indicating the presence of an object, and wirelessly transmit the sensor data to hub device 12. Hub device 12 may be configured to perform an action in response to receiving the sensor data, such as outputting an alert, such as a notification to mobile device 32, or by outputting a command for the respective motion sensor 26 to output an audible or visual alert. In this example, each of motion sensors 26 may include both sensor devices and controllable devices within a single unit.

Door and/or window contact sensor 28 may include a security device configured to detect the opening of a door or window on which the door and/or window contact sensor 28 is installed. For example, contact sensor 28 may include a first component installed on a door or window, and a second component installed on a frame of the respective door or window. When the first component moves toward, past, or away from the second component, the contact sensor 28 may be configured to generate sensor data indicating the motion of the door or window, and wirelessly transmit the sensor data to hub device 12. In response to receiving the sensor data, hub device may be configured to perform an action such as outputting an alert, such as a notification to mobile device 32, or by outputting a command for the respective contact sensor 28 to output an audible or visual alert. In this example, contact sensor 28 may include a sensor devices and a controllable devices within a single unit.

Air vent dampers 36 may be configured to regulate a flow of air inside of a duct. For example, thermostats 24 may generate a control signal to close air vent damper 36A (e.g., when the room is not occupied). In this example, in response to the control signal, air vent damper 36 may close to prevent air from flowing from air vent damper 36A. In some examples, air vent dampers 36 may send sensor data indicating a state (e.g., open or closed) of the respective air vent damper. For instance, air vent damper 36 may output, to thermostats 24 an indication that air vent damper 36 is in an open state.

Smart doorbell 37 may be configured to provide notifications to hub device 12. For example, smart doorbell 37 may be configured to provide a notification (e.g., message) when a button (e.g., doorbell) of smart doorbell 37 is activated. In some examples, smart doorbell 37 may include motion sensor circuitry configured to generate a notification in response to motion detected near smart doorbell 37. In some examples, smart doorbell 37 may be configured to generate video content in response to motion detected near smart doorbell 37. In some examples, smart doorbell 37 may be configured to generate audio content in response to motion detected near smart doorbell 37. For instance, in response to motion detected near smart doorbell 37, smart doorbell 37 may generate video content using a camera and/or audio content using a microphone. In this instance, smart doorbell 37 may output the video content and audio content to hub device 12, which may forward the video content and/or audio content to mobile device 32.

Outdoor air sensor 38 may be configured to generate sensor data indicating, for example, a temperature, humidity, and/or quality (e.g., carbon monoxide, particulate matter, or other hazards) of the surrounding air. In some examples, outdoor air sensor 38 may wireless transmit the sensor data to hub device 12. For instance, outdoor air sensor 38 may periodically output a current or average temperature to thermostats 24 via hub device 12.

Outdoor passive infrared sensors 40 may include security devices configured to detect the presence of a nearby object, such as a person, based on detecting infrared wavelength electromagnetic waves emitted by the object. In response to detecting the infrared waves, passive infrared sensors 40 may generate sensor data indicating the presence of the object, and wirelessly transmit the sensor data to hub device 12. Hub device 12 may be configured to perform an action in response to receiving the sensor data, such as outputting an alert, such as a notification to mobile device 32, or by outputting a command for the respective passive infrared sensor 40 to output an audible or visual alert.

System 20 may include various devices, including, for example, a security device, a water heater, a water flow controller, a garage door controller, or other devices. For example, system 20 may include one or more of: a door contact sensor, a motion passive infrared (PIR) sensor, a mini contact sensor, a key fob, a smoke detector, a glass break detector, a siren, a combined smoke detector and Carbon monoxide (CO) detector, an indoor siren, a flood sensor, a shock sensor, an outdoor siren, a CO detector, a wearable medical pendant, a wearable panic device, an occupancy sensor, a keypad, and/or other devices.

In accordance with the techniques of the disclosure, hub device 12 and each of thermostats 24, motion sensors 26, door/window contact sensor 28, air vent dampers 36, smart doorbell 37, outdoor air sensor 38, and infrared sensors 40 may be configured to operate using a superframe. While various examples described herein use Wi-Fi™ as an example of a first protocol, IEEE 802.15.4 as an example second protocol, and BLUETOOTH as an example of third protocol, in some examples, other protocols may be used. Smart doorbell 37 is used as an example sensor device for example purposes only, and the other devices illustrated in FIG. 2 may operate in a similar, including identical, manner. In some examples, the first protocol, the second protocol, and the third protocol are different from each other. For example, the first protocol may include a local area networking protocol, the second protocol may include a low-power wireless connection protocol, and/or the third protocol may include a high-bandwidth connection protocol. For instance, the first protocol may include Wi-Fi™. In some examples, the second protocol may include IEEE 802.15.4. The third protocol may include BLUETOOTH.

Hub device 12 may assign smart doorbell 37 to a first group. In this example, hub device 12 may output an initial superframe configured for an initial superframe mode. For example, the initial superframe mode may allocate a first BLUETOOTH time slot of 101 ms out of 245 ms. For instance, hub device 12 may output a beacon indicating a beginning of the initial superframe. In this example, smart doorbell 37 may output data during the first BLUETOOTH time slot in compliance with the BLUETOOTH protocol. When in the initial superframe mode, the initial superframe output by the hub device 12 can include slots at the first frequency band.

In response to a detection of movement near smart doorbell 37, smart doorbell 37 may output an indication that video content will be sent to hub device 12 in accordance with the BLUETOOTH protocol. In response to the indication that video content will be sent to hub device 12 in accordance with the BLUETOOTH protocol, hub device 12 may select a BLUETOOTH streaming superframe that allocates 141 ms to BLUETOOTH communications. Hub device 12 may output an updated superframe configured in the BLUETOOTH streaming superframe mode. Furthermore, in response to a detection of movement near smart doorbell 37, smart doorbell 37 may output an indication that data (e.g., video content) will be sent to the hub device 12 using a second, different frequency band. In response to the indication that data will be sent to the hub device 12 using the second, different frequency band, hub device 12 may select a second superframe that allocates at least one slot to communications using the second, different frequency band. Hub device 12 may output an updated superframe (e.g., the second superframe) configured in the multi-frequency superframe mode such that this updated superframe includes the at least one slot for communications using the second, different frequency band.

Figure 3:
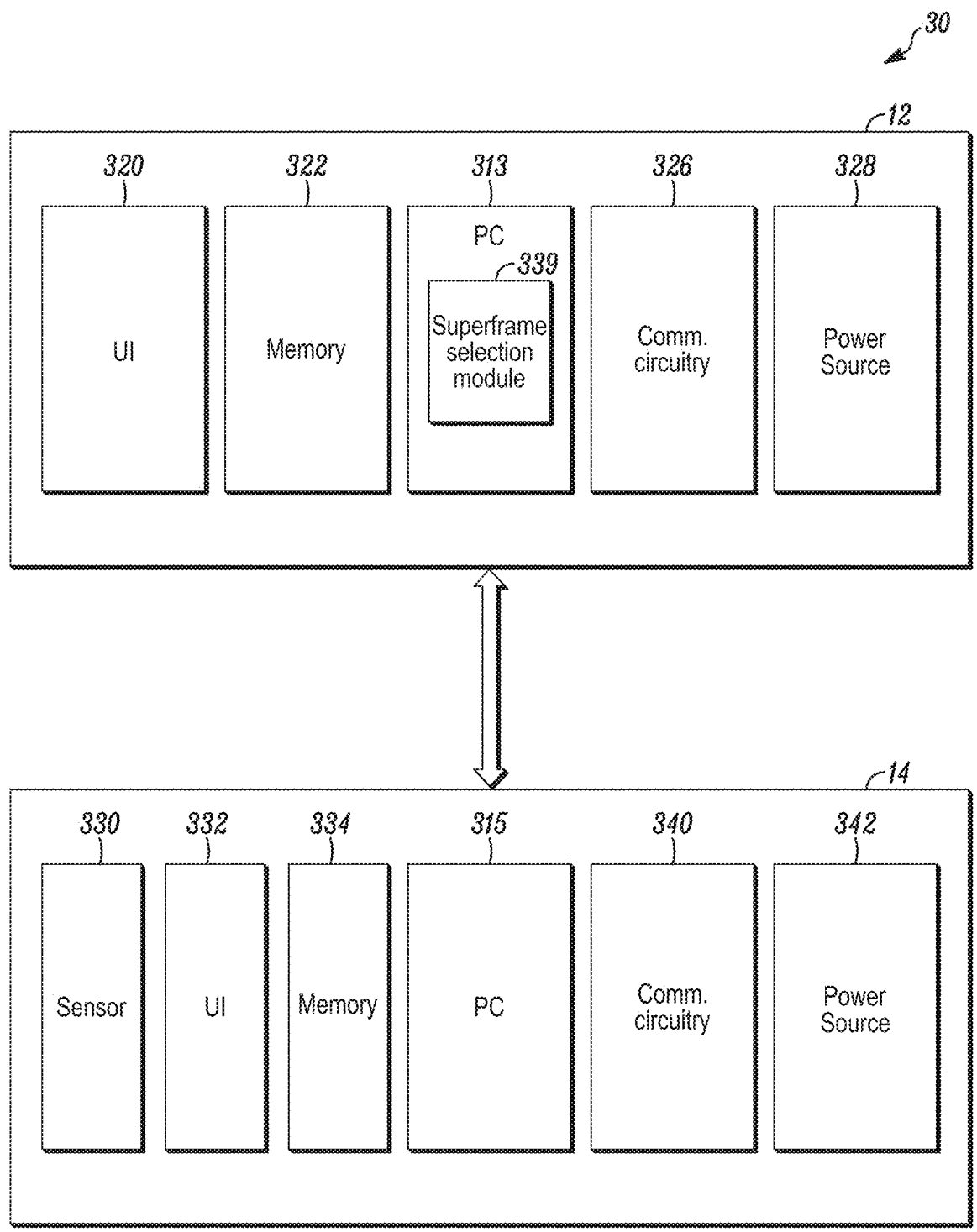
FIG. 3 is a conceptual block diagram of a hub device and a sensor device, in accordance with some examples of this disclosure.

FIG. 3 is a conceptual block diagram of the hub device 12 and the sensor device 14, in accordance with some examples of this disclosure. System 30 may be an example of any of the previous systems 10, 20, or another system. System 30 includes hub device 12 and sensor device 14.

Hub device 12 may include at least a user interface (UI) 320, a memory 322, processing circuitry (PC) 313, communication circuitry 326 ("COMM. CIRCUITRY"), and a power source 328. UI 320 is configured to receive data input from, or output data to, a user. For example, UI 320 may include a display screen, such as a touchscreen, keyboard, buttons, microphone, speaker, camera, or any other user input/output device. Other examples of UI 320 are possible. For example, during an initial setup process, hub device 12 may "scan" a local proximity in order to identify one or more other devices (e.g., devices having recognizable wireless communication capabilities, such as an ability to communicate wireless at a second, different frequency band), and then output for display on a display screen a list of the discovered devices for selection by a user. Via UI 320, a user may also specify one or more parameters in order to control or otherwise manage a comfort and/or security system within a building and the surrounding premises. For example, via UI 320, a user may specify one or more air temperature settings or security settings, such as access codes and/or authorized users.

Hub device 12 includes a memory 322 configured to store data, as well as instructions that, when executed by processing circuitry 313, cause hub device 12 to perform one or more techniques in accordance with this disclosure. Communication circuitry 326 may include components, such as an antenna, configured to wirelessly transmit and receive data according to one or more wireless communication protocols. For example, communication circuitry 326 may be configured to transmit and/or receive data according to the IEEE 802.15.4 protocol, Wi-Fi™, and/or the BLUETOOTH protocol where appropriate, according to one or more constraints of the respective data communication protocols (e.g., communication range, energy requirements, etc.). As an additional example, communication circuitry 326 may be configured to transmit and/or receive data using each of a first frequency band and a second, different frequency band.

Power source 328 may include a wired connection to an electric power grid, due to the energy-intensive operations performed by hub device 12. However, in some examples, power source 328 may additionally or alternatively include an internal power source, such as a battery or supercapacitor. In the example of FIG. 3, hub device 12 omits a sensor, however, in some examples, hub device 12 may further include one or more sensors. Additionally, hub device 12 may be configured as a repeater node.

Sensor device 14 may be configured to wirelessly communicate with hub device 12. Sensor device 14 may include an incorporated sensor 330, a UI 332, a memory 334, processing circuitry (PC) 315, communication circuitry 340, and a power source 342. In some examples, sensor device 14 may include an incorporated sensor device, such as a motion sensor; passive infrared (PIR) sensor; air temperature and/or humidity sensor; air quality (e.g., carbon monoxide or particulate matter) sensor; or a door or window contact sensor, as non-limiting examples. Processing circuitry 313 may include wireless protocol selection module 339 that may be configured to select a first wireless protocol or a second wireless protocol for establishing a wireless connection. In some examples, wireless protocol selection module 339 may be configured to select between three or more wireless protocols for establishing a wireless connection. In addition or alternatively, processing circuitry 313 may include a frequency band selection module that may be configured to select first and second different frequency bands to be used for wireless communication.

UI 330 is configured to receive data input from, or output data to, a user. For example, UI 330 may include a display screen, such as a touchscreen, keyboard, buttons, microphone, speaker, camera, or any other user input/output device. Other examples of UI 330 are possible. For example, during an initial setup process, sensor device 14 may "scan" a local proximity in order to identify one or more hub devices and/or other devices (e.g., devices having recognizable wireless communication capabilities), and then output for display on a display screen a list of discovered devices for selection by a user. Via UI 330, a user may also specify one or more parameters in order to control or otherwise manage a comfort and/or security system within a building and the surrounding premises. For example, via UI 330, a user may specify one or more air temperature settings (e.g., for a thermostat) or security settings, such as access codes and/or authorized users. Sensor device 14 includes a memory 334 configured to store data, as well as instructions that, when executed by processing circuitry 315, cause sensor device 14 to perform one or more techniques in accordance with this disclosure.

Processing circuitry 315 and hub device 12 may exchange network parameters for pairing a BLUETOOTH channel. For example, processing circuitry 315 may determine (e.g., receive from hub device 12 or generate for output to hub device 12), one or more of: (1) a media access control (MAC) address of host device 22 and a MAC address of thermostat 24A; (2) a real time-point in time for the transfer to start (or offset from 802.15.4 start command); (3) an indication of a starting frequency; (4) an indication of a hop set; (5) a connection interval; or (6) a connection latency.

For example, processing circuitry 315 and hub device 12 may exchange a MAC address for device 12 and a MAC address for sensor device 14. In this example, communication circuitry 326 and communication circuitry 340 may be configured to establish a BLUETOOTH channel between the MAC address for hub device 12 and the MAC address for sensor device 14.

In some examples, processing circuitry 315 and hub device 12 may exchange an indication of a particular time to establish the BLUETOOTH channel. In this example, communication circuitry 326 and communication circuitry 340 may be configured to establish the BLUETOOTH channel between hub device 12 and sensor device 14 at the particular time.

For example, processing circuitry 315 and hub device 12 may exchange an indication of a starting frequency to establish the BLUETOOTH channel. In this example, communication circuitry 326 and communication circuitry 340 may be configured to establish a BLUETOOTH channel between hub device 12 and sensor device 14 at the starting frequency. For instance, the BLUETOOTH channel between hub device 12 and sensor device 14 may include 40 1 MHz wide channels that are separated by 21 MHz. In this example, the starting frequency may be an indication of a particular 1 MHz wide channel (e.g., channel 0, 1, . . . 39) and communication circuitry 326 and communication circuitry 340 may be configured to establish a BLUETOOTH channel between hub device 12 and sensor device 14 at the particular 1 MHz wide channel. The various frequencies of BLUETOOTH channels of BLUETOOTH channels, while slightly different from each other, may all correspond to a frequency for a superframe (e.g., 2.4 GHz). The processing circuitry 315 and hub device 12 may exchange an indication of a particular frequency band (e.g., the first frequency band or the second, different frequency band) to be used for wireless communications therebetween.

Processing circuitry 315 and hub device 12 may exchange an indication of a hop set for the BLUETOOTH channel, the hop set indicating a sequence of frequencies. In this example, communication circuitry 326 and communication circuitry 340 may be configured to establish a BLUETOOTH channel between hub device 12 and sensor device 14 to operate at the sequence of frequencies. For instance, the BLUETOOTH channel between hub device 12 and sensor device 14 may include 40 1 MHz wide channels that are separated by 2 MHz. In this example, the sequence of frequencies may be an indication of an order for switching between the 1 MHz wide channels (e.g., channel 0, 1, . . . 39) and communication circuitry 326 and communication circuitry 340 may be configured to establish a BLUETOOTH channel between hub device 12 and sensor device 14 that selects a 1 MHz wide channel according to the order for switching between the 1 MHz wide channels.

In some examples, processing circuitry 315 and hub device 12 may exchange an indication of a connection interval for the BLUETOOTH channel. In this example, communication circuitry 326 and communication circuitry 340 may be configured to establish a BLUETOOTH channel between hub device 12 and sensor device 14 to operate at the connection interval. For instance, rather than exchanging data at any time on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at the connection interval.

Processing circuitry 315 and hub device 12 may exchange an indication of a connection latency for the BLUETOOTH channel. In this example, communication circuitry 326 and communication circuitry 340 may be configured to establish a BLUETOOTH channel between hub device 12 and sensor device 14 to operate at the connection latency. For instance, rather than exchanging data at any time or at a connection interval on the BLUETOOTH channel between hub device 12 and sensor device 14, the BLUETOOTH channel between hub device 12 and sensor device 14 may be configured to initiate a transfer of data on BLUETOOTH channel between hub device 12 and sensor device 14 at a latency interval of sensor device 14 or hub device 12. This latency interval may be selected to reduce a time a radio of sensor device 14 and/or hub device 12 listens for data (further from a connection interval), which may reduce a power consumption of sensor device 14 and/or hub device 12 compared to systems that omit a latency interval or use a zero latency interval.

Processing circuitry 315 and hub device 12 may exchange an indication of antenna information for a plurality of antennas at sensor device 14. In this example, communication circuitry 326 and communication circuitry 340 may be configured to select a particular antenna from the plurality of antennas based on the antenna information and to establish a BLUETOOTH channel between hub device 12 and sensor device 14 using the particular antenna.

Hub device 12 and sensor device 14 may be configured to operate using a superframe. For example, sensor device 14 may output an enrollment signal to hub device 12, which in some cases can include an indication of a frequency band at which the sensor device 14 desires to communicate with the hub device 12. Hub device 12 may assign sensor device 14 a group number and output an indication of the group number to sensor device 14. Hub device 12 may then control a timing of communications using the superframe. For example, hub device 12 may specify a start of a superframe using a beacon and identify devices that may communicate by specifying a group assigned to the superframe. In this way, sensor device 14 may determine when to output data. For example, sensor device 14 may, in response to a beacon output by hub device 12 indicating the group number assigned to sensor device 14, output data in accordance with the superframe.

Superframe selection module 339 may select a superframe mode. In some examples, superframe selection module 339 may select a superframe mode based on configuration data received by hub device 12. For example, superframe selection module 339 may select a multi-frequency superframe mode when superframe selection module 339 determines a presence of sensor device s14 capable of wireless communication using a first frequency band and a second, different frequency band.

Superframe selection module 339 may select a superframe mode based on operating parameters of system 30. For example, superframe selection module 339 may determine that sensor device 14 is attempting to pair (e.g., exchange a MAC address, channel hop set, etc.) with hub device 12 using a second, different frequency band. In this example, superframe selection module 339 may select a multi-frequency superframe mode that allocates a slot to communications at the second, different frequency. Allocating time to communications at the second, different frequency may improve a bandwidth of system 30 as well as a reliability and operation of system 30.

In some examples, superframe selection module 339 may determine that sensor device 14 is going to send high bandwidth data (e.g., audio and/or video content) to hub device 12 using BLUETOOTH. In this example, superframe selection module 339 may select a superframe mode (e.g., the multi-frequency superframe mode) that allocates additional time to BLUETOOTH communications. Allocating additional time to BLUETOOTH for audio and/or video content may improve a bandwidth of system 30.

Figure 4:
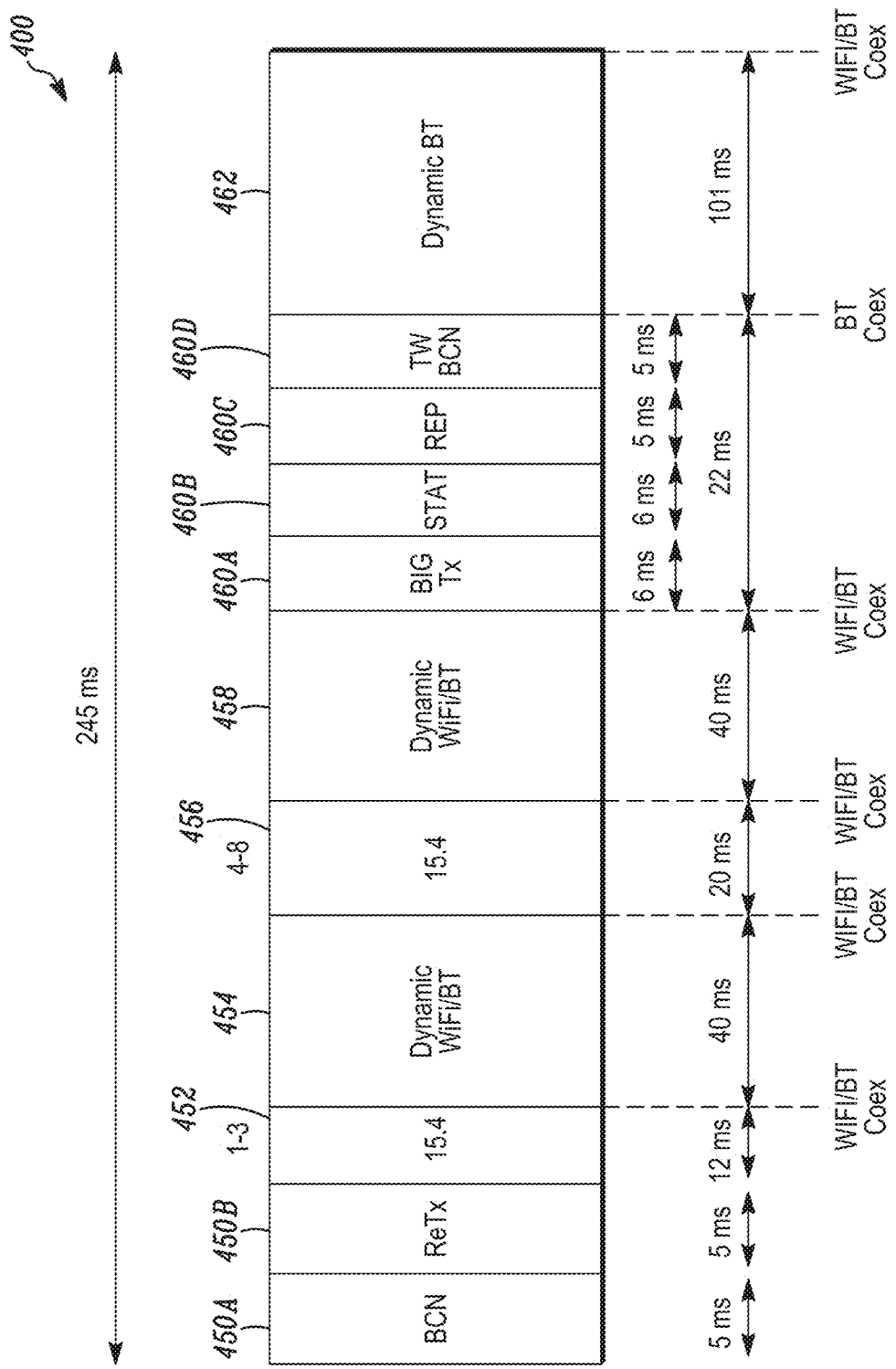
FIG. 4 is a conceptual block diagram of a first example of slots of a single superframe, for instance in an initial superframe mode, in accordance with some examples of this disclosure.

FIG. 4 is a conceptual block diagram of a first example of slots for a first superframe, for instance configured in an initial superframe mode, in accordance with some examples of this disclosure. Thus, the first superframe 400 can be one example of a first superframe configured in an initial superframe mode. The first superframe 400, configured in the initial superframe emode, can include the slots as allocated to communications using a first frequency band (e.g., first superframe 400 in the initial superframe mode may include only slots allocated to communications using the first frequency band). As shown, the first superframe 400 may include a beacon slot 450A ("BCN 450A") and a retransmission slot 450B ("ReTx"), which may be collectively referred to here as beacon slot A 450. The order of slots shown in FIG. 4 is for example purposes only. Timing shown in FIG. 4 is for example purposes only. For example, the first superframe 400 may be shorter than 245 ms or longer than 245 ms. The first superframe 400 is for example purposes only. For example, a superframe may include different slots (e.g., one or more slots may be removed and/or one or more slots may be added) and/or may include slots of different widths (e.g., different durations) than superframe 400.

Beacon slot 450A may mark the beginning of superframe 400. Beacon slot 450A may be used by all the end devices (e.g., sensor devices 14) to synchronize to the coordinator (e.g., hub device 12). As such, all devices in the system may synchronize to a master clock of the coordinator (e.g., hub device 12) thus forming a time synchronized networking system. Beacon slot 450A may include information that is used by the end devices to understand the system status, respond to commands, or other information, such as a frequency band at which a device (e.g., sensor device 14) will be communicating. The duration of beacon slot 450A may be 5 ms. The order of beacon slot 450A and a retransmission slot 450B shown in FIG. 4 is for example purposes only. Beacon slot A 450 may include additional or fewer slots. In some examples, the timing of beacon slot 450A may be less than 5 ms or more than 5 ms.

Retransmission slot 450B may be used for a new (e.g., non-enrolled) devices to associate with a coordinator (e.g., hub device 12) and thus become part of a personal area network (PAN), such as system 10, system 20, system 30 or another system. Once the enrollment mode is disabled, end devices of the previous superframe group may use retransmission 450B to attempt retransmission. The duration of retransmission slot 450B may be 5 ms.

15.4 slots 452 and 456 may be used for communications compliant with IEEE 802.15.4. In an example, there may be up to 2 or 4 15.4 slots in a superframe, however, other examples may use other combinations. Each slot may include sub-slots comprising a duration of, for example, 2 ms, 4 ms, 5, ms, etc. End devices (e.g., sensor devices 14) may use 15.4 slots 452 and 456 to transmit an alarm message, a status message, a Redlink™ network protocol (RNP) message, a supervision message, or other information. The total duration of each of 15.4 slot 452 and 15.4 slot 456 time segment may be, for example, 32 ms or 64 ms. The media access protocol for 15.4 slots 452 and 456 used may be TDMA. If a sensor device is not enrolled in a 15.4 slot, hub device 12 may allocated the 15.4 slots to Wi-Fi™ or BLUETOOTH.

Dynamic Wi-Fi™ BLUETOOTH slot 454 ("DYNAMIC Wi-Fi™/BT 454") and dynamic Wi-Fi™ BLUETOOTH slot 458 ("DYNAMIC Wi-Fi™/BT 458") may be referred to herein as a Wi-Fi™ coexistence time segments. A Wi-Fi™ time segment may be used by a Wi-Fi™ module populated on a thermostat device to transmit different types of network packets. Dynamic Wi-Fi™ BLUETOOTH slot 454, 458 may include alarm messages from the thermostat device to the central monitoring station, video streaming packets from one Wi-Fi™ client (e.g., camera or video capable sensor video/image) to another (e.g., GUI based touch screen/Cloud, etc.). The Wi-Fi™ might be operating in different modes: (a) Wi-Fi™ Client, (b) Wi-Fi™-AP, (c) Wi-Fi™-Hybrid. Wi-Fi™ slots may be dynamic, these slots may be shared to BLUETOOTH or Wi-Fi™ depending on different modes of superframes. As shown, dynamic Wi-Fi™ BLUETOOTH slot 454 and dynamic Wi-Fi™ BLUETOOTH slot 458 may be 40 ms.

Big TX/RX Slot 460A ("Big Tx 460A"), status slot 460B, repeater slot 460C ("REP 460C"), and twin beacon slot 460D ("TW BCN 460D") may be collectively referred to herein as beacon slot B 460. The order of Big TX/RX Slot 460A, status slot 460B, repeater slot 460C, and twin beacon slot 460D shown in FIG. 4 is for example purposes only. Beacon slot B 460 may include additional or fewer slots.

Big TX/RX Slot 460A may include one or more large data transmit slots that are each more than 10 bytes and may be up to 96 bytes. An access point (e.g., hub device 12) may be able to send any data to any device using this slot. Data can be unicast, broadcast or groupcast depending on a type of request. This mode of communication may be indicated in beacon A slot 450. Big TX/RX Slot 460A may be used to send over-network download (OND) blocks to sensor devices or to set configure sensor devices. If the TX/RX Slot 460A is not active, hub device 12 may allocate time for TX/RX Slot 460A to Wi-Fi™ to increase time for Wi-Fi™ communication.

Status slot 450B may share a status with some or all of sensor devices 14. Status slot 450B may not be active at every instance of a superframe. Status slot 450B may include data that is unicast, broadcast, or groupcast depending on a type of request. This mode of communication may be indicated in beacon A slot 450.

Repeater slot 460C may be configured for sending and receiving data from repeaters of a large/small data. An access point (e.g., hub device 12) may be able to send any data to any repeater using repeater slot 460C. Data included in repeater slot 460C can be unicast, broadcast or groupcast depending on a type of request. This mode of communication may be indicated in beacon A slot 450.

Twin beacon slot 460D may be called information beacon/twin beacon. Payload of twin beacon 460D may be almost same as beacon slot 450A with some exceptions but may operate in a different channel referred to herein as an information channel. Twin beacon slot 460D may be present in all superframes irrespective of modes of operation. Twin beacon slot 460D may be used by all the end devices to synchronize to the coordinator only if they lose connection with an access point using beacon slot 450A. Twin beacon slot 460D may not be used for synchronization of time but may be used to share the information like what is the operation channel or frequency hopping sequence or a next channel of communication. The duration of twin beacon slot 460D may be 5 ms. In some examples, the timing of twin beacon slot 460D may be less than 5 ms or more than 5 ms.

Dynamic BLUETOOTH slot 462 may be dedicated to BLUETOOTH by an access Point (e.g., hub device 12). Dynamic BLUETOOTH slot 462 may support mobile and sensor communication. Allocation of dynamic BLUETOOTH slot 462 may vary with different modes of comfort/security superframes as described further below. As shown, dynamic BLUETOOTH slot 462 may be 101 ms. In some examples, the timing of dynamic BLUETOOTH slot 462 may be less than 101 ms or more than 101 ms.

FIGS. 5-8 illustrate examples of a superframe configured in a multi-frequency superframe mode. As shown in the embodiments of FIGS. 5-8, a single superframe can be configured in a multi-frequency superframe mode such that the single superframe has at least one slot, of a plurality of slots for wireless communication, allocated to the first protocol at the first frequency band, the second protocol at the first frequency band, or the third protocol at the first frequency band, and at least one slot, of the plurality of slots for wireless communication, allocated to the first protocol at a second frequency band, the second protocol at the second frequency band, or the third protocol at the second frequency band, where the second frequency band is different than the first frequency band. In this way, a single superframe, configured in the multi-frequency superframe mode, can facilitate wireless communication between a hub device and a plurality of sensor devices using different frequency bands within a single superframe and, for instance in some cases, also using a single PAN ID (e.g., and on a single radio).

As FIGS. 5-8 illustrate, the processing circuitry can be configured to output, to the plurality of devices, a superframe configured in the multi-frequency superframe mode in a dynamic manner. Namely, the processing circuitry can use network-related information to determine when to allocate a slot of a superframe for wireless communications using a second, different frequency band, where the slot should be allocated in the time sequence of the superframe, and an amount of the superframe's bandwidth to be allocated to one or more slots for wireless communications using the second, different frequency band. FIGS. 5-8 illustrate embodiments with differing slot allocations, relative to the superframe's time sequence and bandwidth, for communications using the second, different frequency band.

As one example, the processing circuitry can be configured to determine a presence of a device, of the plurality of devices, capable of wireless communication using the second frequency band. For instance, in some embodiments, the processing circuitry can be configured to determine the presence of the device capable of wireless communication using the second frequency band via a second frequency band notification received from that device capable of wireless communication using the second frequency band. The second frequency band notification can be received from the device, capable of wireless communication using the second frequency band, via any one of the slots of the initial superframe (e.g., superframe 400), configured in the initial superframe mode (e.g., using one of the first protocol at the first frequency band, the second protocol at the first frequency band, or the third protocol at the first frequency band). In another instance, in some embodiments, the processing circuitry can be configured to receive a data size notification from the device, capable of wireless communication using the second frequency band. The data size notification can be received from the device, capable of wireless communication using the second frequency band, via any one of the slots of the initial superframe (e.g., superframe 400), configured in the initial superframe mode (e.g., using one of the first protocol at the first frequency band, the second protocol at the first frequency band, or the third protocol at the first frequency band). As one example, the data size notification an include an indication as to whether the device capable of wireless communication using the second frequency band is to output video and/or audio content. In response to receiving the data size notification, the processing circuitry can be configured to determine a bandwidth, corresponding to the data size notification, of the at least one slot of the plurality of slots for wireless communication allocated in the multi-frequency superframe mode to the first protocol at the second frequency band, the second protocol at the second frequency band, or the third protocol at the second frequency band. As one example, in response to determining the bandwidth of the at least one slot of the plurality of slots for wireless communication allocated in the multi-frequency superframe mode to the first protocol at the second frequency band, the second protocol at the second frequency band, or the third protocol at the second frequency band, the processing circuitry can be further configured to reduce a bandwidth of at least one of the slot of the plurality of slots for wireless communication allocated in the multi-frequency superframe mode to the first protocol at the first frequency, the slot of the plurality of slots for wireless communication allocated in the multi-frequency superframe mode to the second protocol at the first frequency band, and the slot of the plurality of slots for wireless communication allocated in the multi-frequency superframe mode to the third protocol at the first frequency (e.g., in the embodiment shown in FIG. 5, the bandwidth of dynamic BLUETOOTH slot 462 has been reduced). This reduction in bandwidth of the at least one slot allocated to communications at the first frequency band (e.g., in the embodiment shown in FIG. 5, the reduction in bandwidth allocated to dynamic BLUETOOTH slot 462) can be to an extent corresponding to the bandwidth determined to correspond to the data size notification.

In each of these various instances of determining the presence of the device capable of wireless communication using the second frequency band, in response to determining the presence of the device capable of wireless communication using the second frequency band, the processing circuitry can be configured to output, to the plurality of devices, the second superframe configured in the multi-frequency superframe mode.

Figure 5:
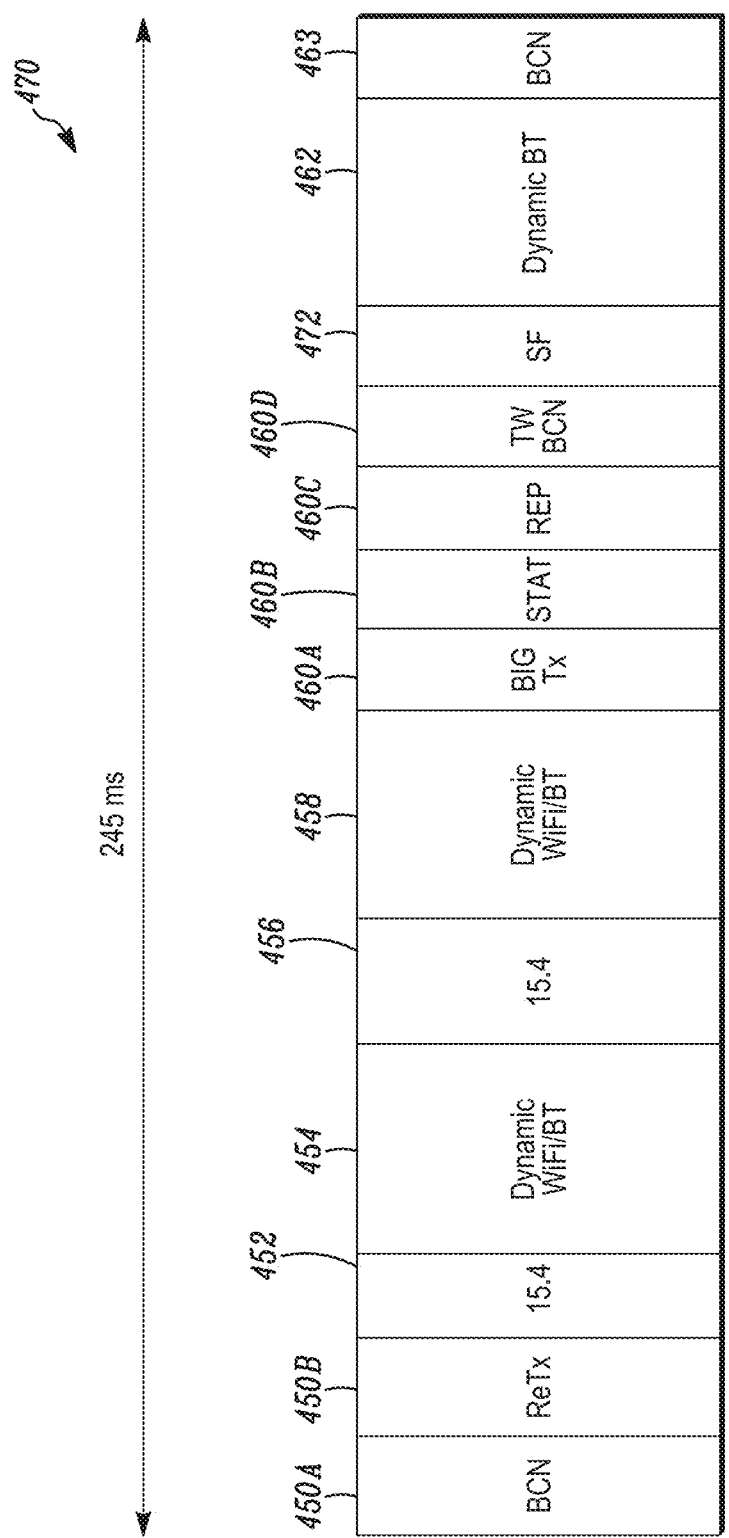
FIG. 5 is a conceptual block diagram of a second example of slots of a single superframe, for instance in a first embodiment of a multi-frequency superframe mode, in accordance with some examples of this disclosure.

FIG. 5 is a conceptual block diagram of a second example of slots of a single superframe 470. The superframe 470 is shown here configured in a first embodiment of a multi-frequency superframe mode, in accordance with some examples of this disclosure. The superframe 470 can be similar to the superframe 400, as described in reference to FIG. 4, except that the superframe 470 additionally includes a second frequency band ("SF") slot 472 that is allocated for wireless communication at the second, different frequency band. In some embodiments, the slots other than the SF slot 472 can be allocated to wireless communication at the first frequency band, while the SF slot 472 is allocated to wireless communication at the second, different frequency band. As one example, the SF slot 472 of the superframe 470 can be allocated to wireless communication at the second, different frequency band that is a sub 1 GHz frequency band (e.g., center frequency of the second frequency band is sub 1 GHz), while the slots other than the SF slot 472 of the superframe 470 can be allocated to wireless communication at the first frequency band that is a 2.4 GHz frequency band (e.g., center frequency of the first frequency band is 2.4 GHz).

In the exemplary embodiment shown in FIG. 5, the SF slot 472 is located in the time sequence of the superframe 470 between the TW BCN slot 460D and the Dynamic BLUETOOTH slot 462. In this embodiment, the bandwidth of the Dynamic BLUETOOTH slot 462 has been reduced, relative to that shown for the initial superframe 400 in the initial superframe mode, to accommodate the allocated SF slot 472, and the slots other than the Dynamic BLUETOOTH slot 462 can have the same bandwidth (e.g., same time duration) as shown for the initial superframe 400 in the initial superframe mode of FIG. 4.

As with the superframe 400 outputting the BCN slot 450A to indicate a starting of the superframe 400 and a group number assigned to each device of the plurality of devices on the network, the superframe 470 can output the BCN slot 450A indicating a starting of the superframe 470 and the group number assigned to each device of the plurality of devices on the network. As shown in the exemplary embodiment here, the superframe 470 can, in some cases, conclude with a BCN slot 463.

Figure 6:
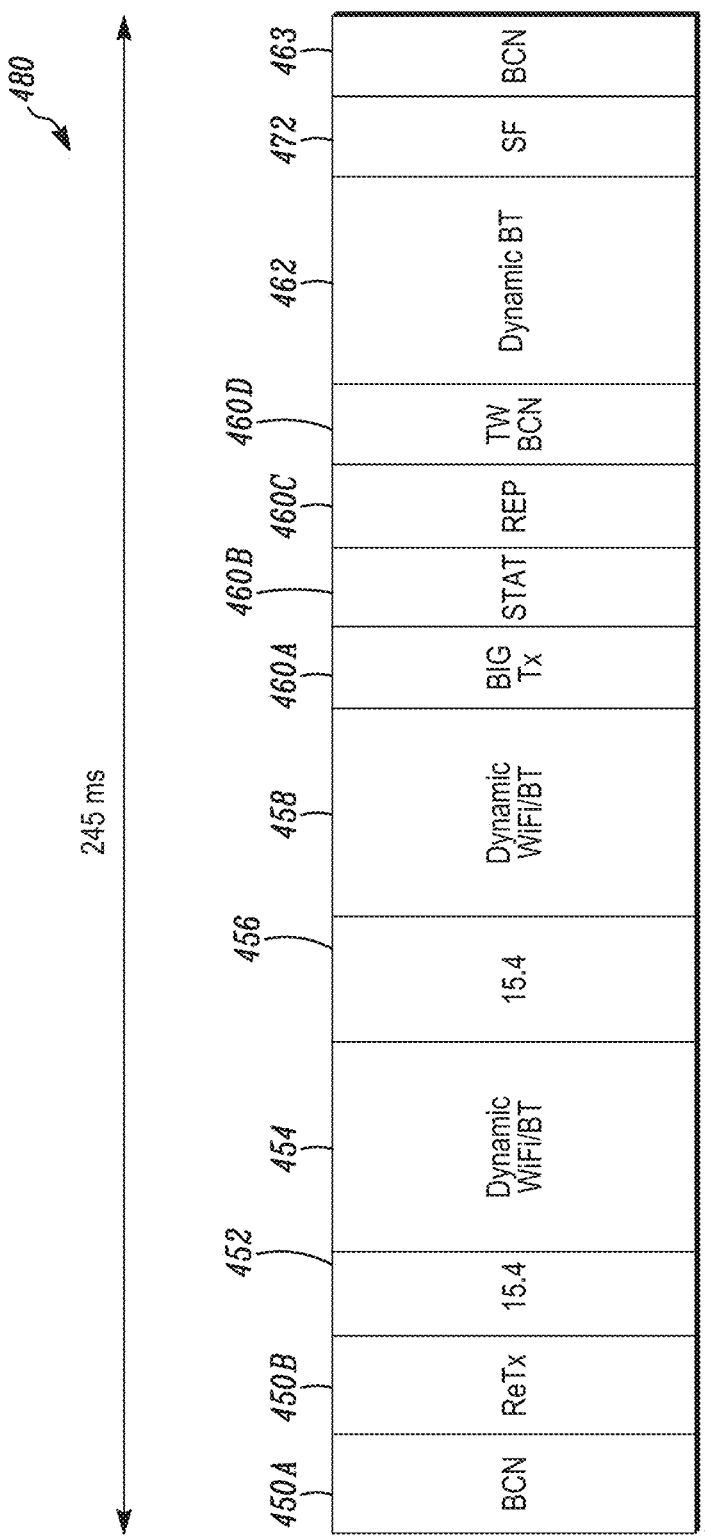
FIG. 6 is a conceptual block diagram of a third example of slots of a single superframe, for instance in second embodiment of a multi-frequency superframe mode, in accordance with some examples of this disclosure.

FIG. 6 is a conceptual block diagram of a third example of slots of a single superframe 480. The superframe 480 is shown here configured in a second embodiment of a multi-frequency superframe mode, in accordance with some examples of this disclosure.

The superframe 480 can be similar to the superframe 470 described in reference to FIG. 5 except that the SF slot 472 is at a different location in the time sequence of the superframe 480. Namely, in this embodiment, the SF slot 472 is after the Dynamic BLUETOOTH slot 462 in the time sequence of the superframe 480. As described elsewhere herein, since a superframe can be configured in a multi-frequency superframe mode on a dynamic basis when useful based on network information, the location in the time sequence of, as well as the bandwidth dedicated to, one or more slots for wireless communication at the second, different frequency band can be adjusted. As such, the superframe 480 includes the SF slot 472 at an adjusted location in the time sequence of the superframe 480 as compared to the location of the SF slot 472 in the time sequence of the superframe 470. Thus, prior to outputting a superframe with a slot allocated to wireless communication at the second, different frequency band, the processing circuitry can utilize network information to determine characteristics (e.g., location in the time sequence of and/or bandwidth dedicated to, the superframe in the multi-frequency superframe mode) of the one or more SF slots 472. Likewise, the processing circuitry can make one or more corresponding reductions in the bandwidth of one or more slots other than the one or more SF slots 472 to accommodate the one or more SF slots 472 in the superframe.

Figure 7:
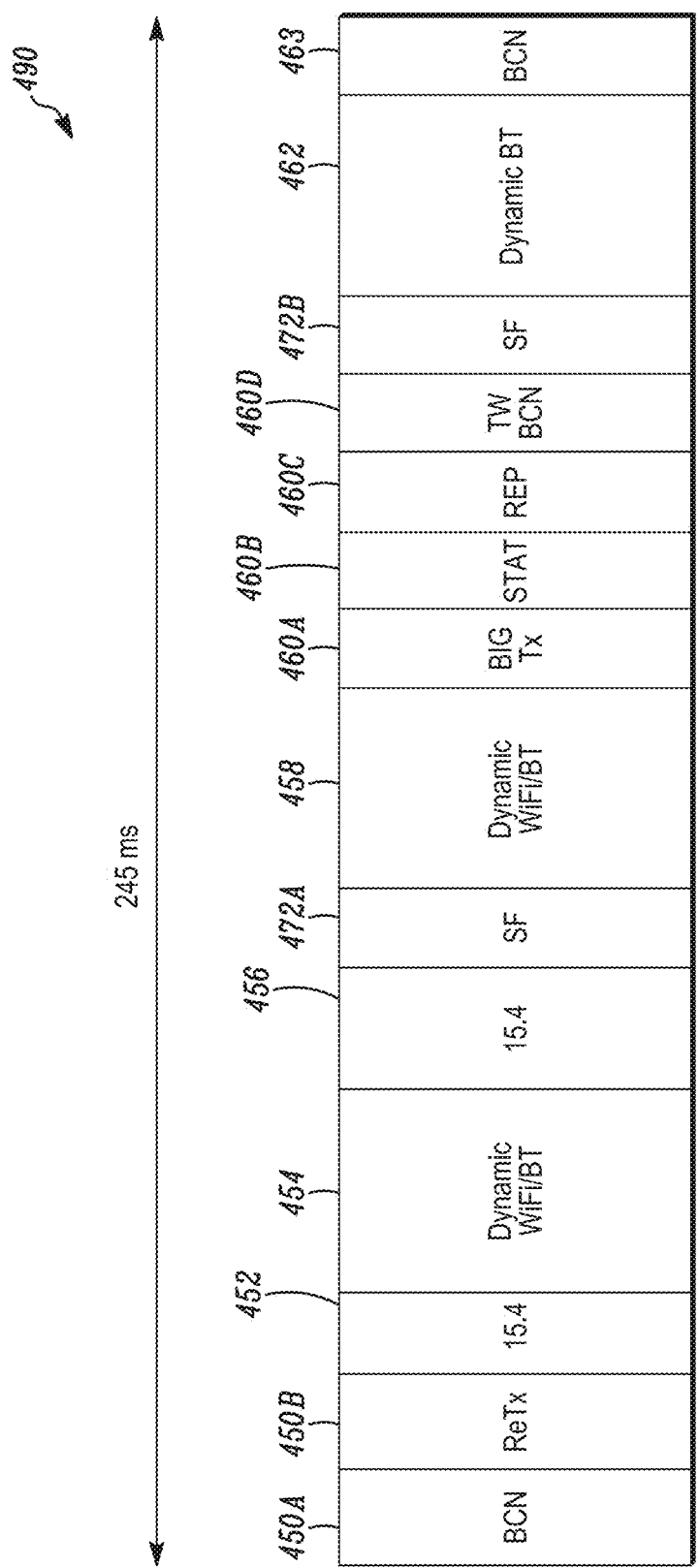
FIG. 7 is a conceptual block diagram of a fourth example of slots of a single superframe, for instance in third embodiment of a multi-frequency superframe mode, in accordance with some examples of this disclosure.

FIG. 7 is a conceptual block diagram of a fourth example of slots of a single superframe 490. The superframe 490 is shown here configured in a third embodiment of a multi-frequency superframe mode, in accordance with some examples of this disclosure.

The superframe 490 can be similar to the superframes 470 and 480 described in reference to FIGS. 5 and 6 except that the superframe 490 includes multiple SF slots—SF slot 472A and SF slot 472B. Namely, in this embodiment, one SF slot 472A is located in the time sequence of the superframe 490 after the 15.4 slot 456 and before the DYNAMIC Wi-Fi™/BT 458, and another SF slot 472B is located in the time sequence of the superframe 490 after the TW BCN slot 460D and before the Dynamic BLUETOOTH slot 462. Again, as described elsewhere herein, since a superframe can be configured in a multi-frequency superframe mode on a dynamic basis when useful based on network information, the location in the time sequence of, as well as the bandwidth dedicated to (e.g., the number of SF slots and/or the time duration of one or more SF slots), one or more slots for wireless communication at the second, different frequency band can be adjusted so as to be configured as appropriate for the network in which the superframe configured in the multi-frequency superframe mode is to be output (e.g., when one or more devices in the network are capable of wireless communication using the second, different frequency band via the allocated SF slot(s) 472). For example, the superframe 490 can be configured, in the multi-frequency superframe mode, to support wireless communication over the network between the hub device and up to thirty-two sensor devices utilizing the second, different frequency band (e.g., a sub 1 GHz band) during the allocated SF slots 472A, 472B.

Figure 8:
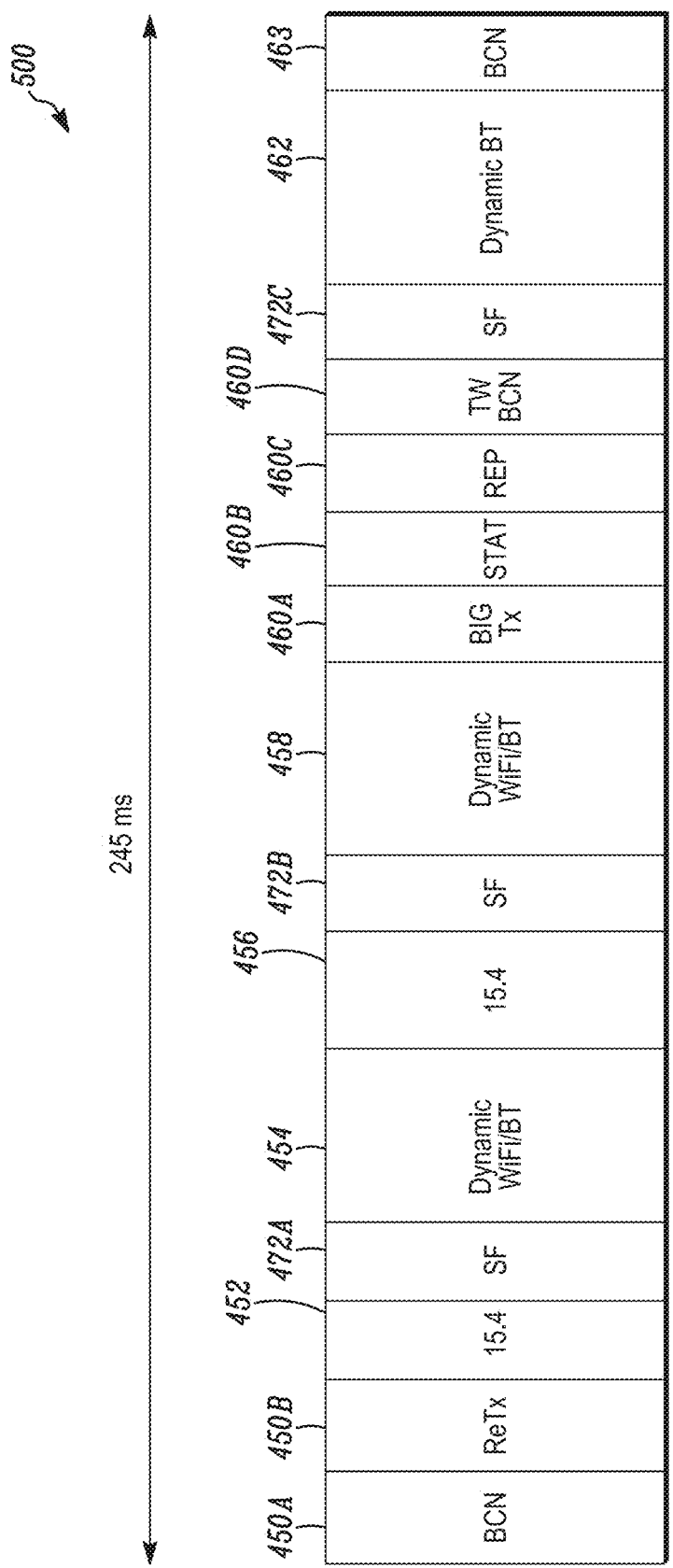
FIG. 8 is a conceptual block diagram of a fifth example of slots of a single superframe, for instance in fourth embodiment of a multi-frequency superframe mode, in accordance with some examples of this disclosure.

FIG. 8 is a conceptual block diagram of a fifth example of slots of a single superframe 500. The superframe 500 is shown here configured in a fourth embodiment of a multi-frequency superframe mode, in accordance with some examples of this disclosure.

The superframe 500 can be similar to the superframes 470, 480, 490 described in reference to FIGS. 5-7 except that the superframe 500 includes more bandwidth dedicated to SF slots. As such, the superframe 500, configured in the multi-frequency superframe mode, can be useful to output when network information indicates a relatively large number of sensor devices in the network capable of wireless communication with the hub device via the second, different frequency band. Namely, the superframe 500 includes three SF slots—SF slot 472A, SF slot 472B, and SF slot 472C.

The SF slot 472A is located in the time sequence of the superframe 500 after the 15.4 slot 452 and before the DYNAMIC Wi-Fi™/BT 454, the SF slot 472B is located in the time sequence of the superframe 500 after the 15.4 slot 456 and before the DYNAMIC Wi-Fi™/BT 458, and the SF slot 472C is located in the time sequence of the superframe 500 after the TW BCN slot 460D and before the Dynamic BLUETOOTH slot 462. For example, with the increased bandwidth allocated to the SF slots, the superframe 500 can be configured, in the multi-frequency superframe mode, to support wireless communication over the network between the hub device and up to sixty-four sensor devices utilizing the second, different frequency band (e.g., a sub 1 GHz band) during the allocated SF slots 472A, 472B, 472C.

Thus, the dynamic nature in which the processing circuitry can output the superframe configured in the multi-frequency superframe mode can allow for improved optimization of bandwidth for wireless communications in the network. For example, when no sensor devices in the network will communicate using the second, different frequency band, the processing circuitry can output a superframe in the initial superframe mode where all slots are allocated to wireless communication at the first frequency band. As another example, when a relatively small number of sensor devices in the network will communicate using the second, different frequency band and/or when a relatively small data size is to be communicated using the second, different frequency, the processing circuitry can output a superframe configured in the multi-frequency superframe mode where a relatively small amount of bandwidth is allocated to wireless communication at the second, different frequency band and a relatively large amount of bandwidth is allocated to wireless communication at the first frequency band (e.g., as in the superframes 470, 480). And, as a further example, when a relatively large number of sensor devices in the network will communicate using the second, different frequency band and/or when a relatively large data size is to be communicated using the second, different frequency, the processing circuitry can output a superframe configured in the multi-frequency superframe mode where a relatively large amount of bandwidth is allocated to wireless communication at the second, different frequency band and a relatively small amount of bandwidth is allocated to wireless communication at the first frequency band (e.g., as in the superframes 490, 500).

Figure 9:
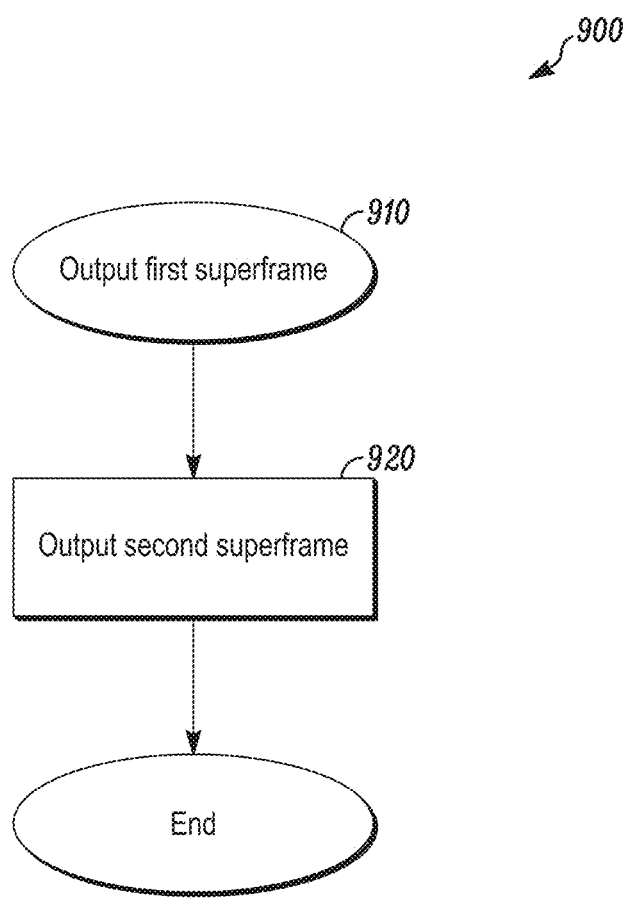
FIG. 9 is a flow diagram illustrating a method, in accordance with some examples of this disclosure.

FIG. 9 is a flow diagram of one exemplary embodiment of a method 900. The method 900 can be used, for instance, to communicate with a plurality of devices using time divisional multiple access (TDMA) in a dynamic manner that can utilize a superframe configured in the initial superframe mode and (e.g., at a different time) a superframe configured in the multi-frequency superframe mode.

At step 910, the method 900 can include outputting, to a plurality of devices, a first superframe configured in an initial superframe mode. The initial superframe mode can allocate each slot of a plurality of slots for wireless communication to a first protocol at a first frequency band, a second protocol at the first frequency band, or a third protocol at the first frequency band. The first protocol, the second protocol, and the third protocol can be different from each other. The first superframe can be output by processing circuitry of a hub device, for instance as described elsewhere herein. And, the plurality of devices, for instance, sensor devices as described elsewhere herein, can be on a single PAN with the hub device. In some embodiments, outputting the first superframe can include outputting, by the processing circuitry, a beacon indicating a starting of the first superframe and indicating a group number assigned to each device of the plurality of devices.

At step 920, the method 900 can include outputting, to the plurality of devices, a second superframe configured in a multi-frequency superframe mode. The multi-frequency superframe mode can allocate: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at a second frequency band, the second protocol at the second frequency band, or the third protocol at the second frequency band. The second frequency band can be different than the first frequency band. Like the first superframe, the second superframe can be output by processing circuitry of the hub device, for instance as described elsewhere herein. In some embodiments, outputting the second superframe can include outputting, by the processing circuitry, a second beacon indicating a starting of the second superframe and indicating the group number assigned to each device of the plurality of devices.

In certain example, the method 900 can further include determining (e.g., by the processing circuitry) a presence of a device of the plurality of devices capable of wireless communication using the second frequency band. For instance, determining (e.g., by the processing circuitry) the presence of the device of the plurality of devices capable of wireless communication using the second frequency band can include using a second frequency band notification received from the device of the plurality of devices capable of wireless communication using the second frequency band. The second frequency band notification can be received from the device of the plurality of devices capable of wireless communication using the second frequency band via a slot of the plurality of slots of the initial superframe using one of the first protocol at the first frequency band, the second protocol at the first frequency band, or the third protocol at the first frequency band. And, in response to determining the presence of the device of the plurality of devices capable of wireless communication using the second frequency band, outputting (e.g., by the processing circuitry), to the plurality of devices, the second superframe configured in the multi-frequency superframe mode.

The disclosure may be implemented using computer-readable storage media comprising instructions to cause a processor to perform any of the functions and techniques described herein. The computer-readable storage media may take the example form of any volatile, non-volatile, magnetic, optical, or electrical media, such as a RAM, ROM, NVRAM, EEPROM, or flash memory. The computer-readable storage media may be referred to as non-transitory. A computing device may also contain a more portable removable memory type to enable easy data transfer or offline data analysis.

The techniques described in this disclosure, may be implemented, at least in part, in hardware, software, firmware or any combination thereof. For example, various aspects of the techniques may be implemented within one or more processors, including one or more microprocessors, DSPs, ASICs, FPGAs, or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry.

As used herein, the term "circuitry" refers to an ASIC, an electronic circuit, a processor (shared, dedicated, or group) and memory that execute one or more software or firmware programs, a combinational logic circuit, or other suitable components that provide the described functionality. The term "processing circuitry" refers one or more processors distributed across one or more devices. For example, "processing circuitry" can include a single processor or multiple processors on a device. "Processing circuitry" can also include processors on multiple devices, wherein the operations described herein may be distributed across the processors and devices.

Such hardware, software, firmware may be implemented within the same device or within separate devices to support the various operations and functions described in this disclosure. For example, any of the techniques or processes described herein may be performed within one device or at least partially distributed amongst two or more devices. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in an article of manufacture including a non-transitory computer-readable storage medium encoded with instructions. Instructions embedded or encoded in an article of manufacture including a non-transitory computer-readable storage medium encoded, may cause one or more programmable processors, or other processors, to implement one or more of the techniques described herein, such as when instructions included or encoded in the non-transitory computer-readable storage medium are executed by the one or more processors. Example non-transitory computer-readable storage media may include RAM, ROM, programmable ROM (PROM), EPROM, EEPROM, flash memory, a hard disk, a compact disc ROM (CD-ROM), a floppy disk, a cassette, magnetic media, optical media, or any other computer readable storage devices or tangible computer readable media.

In some examples, a computer-readable storage medium comprises non-transitory medium. The term "non-transitory" may indicate that the storage medium is not embodied in a carrier wave or a propagated signal. In certain examples, a non-transitory storage medium may store data that can, over time, change (e.g., in RAM or cache). Elements of devices and circuitry described herein may be programmed with various forms of software. The one or more processors may be implemented at least in part as, or include, one or more executable applications, application modules, libraries, classes, methods, objects, routines, subroutines, firmware, and/or embedded code, for example.

Various examples have been described. Any combination of the described apparatuses, systems, methods, operations, and/or functions is contemplated. These and other examples are within the scope of the following claims.

What is claimed is:

1. An apparatus for communication with a plurality of devices, the apparatus comprising processing circuitry configured to:
   output, to the plurality of devices, a first superframe configured in an initial superframe mode, the initial superframe mode allocating each slot of a plurality of slots for wireless communication to a first protocol at a first frequency band, a second protocol at the first frequency band, or a third protocol at the first frequency band, wherein the first protocol, the second protocol, and the third protocol are different from each other;
   determine a presence of a device of the plurality of devices capable of wireless communication using a second frequency band;
   receive a data size notification from the device of the plurality of devices capable of wireless communication using the second frequency band; and
   in response to determining the presence of the device of the plurality of devices capable of wireless communication using the second frequency band, output, to the plurality of devices, a second superframe configured in a multi-frequency superframe mode, the multi-frequency superframe mode allocating: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at the second frequency band, the second protocol at the second frequency band, or the third protocol at the second frequency band, wherein the second frequency band is different than the first frequency band,
   wherein, in response to receiving the data size notification, the processing circuitry is configured to determine a bandwidth, corresponding to the data size notification, of the at least one slot of the plurality of slots for wireless communication allocated in the multi-frequency superframe mode to the first protocol at the second frequency band, the second protocol at the second frequency band, or the third protocol at the second frequency band.

2. The apparatus of claim 1,
   wherein, to output the first superframe, the processing circuitry is configured to output a beacon indicating a starting of the first superframe and indicating a group number assigned to each device of the plurality of devices; and
   wherein, to output the second superframe, the processing circuitry is configured to output a second beacon indicating a starting of the second superframe and indicating the group number assigned to each device of the plurality of devices.

3. The apparatus of claim 1, wherein the processing circuitry is configured to determine the presence of the device of the plurality of devices capable of wireless communication using the second frequency band via a second frequency band notification received from the device of the plurality of devices capable of wireless communication using the second frequency band.

4. The apparatus of claim 3, wherein the second frequency band notification is received from the device of the plurality of devices capable of wireless communication using the second frequency band via a slot of the plurality of slots of the initial superframe using one of the first protocol at the first frequency band, the second protocol at the first frequency band, or the third protocol at the first frequency band.

5. The apparatus of claim 1, wherein the data size notification comprises an indication as to whether the device of the plurality of devices capable of wireless communication using the second frequency band is to output video and/or audio content.

6. The apparatus of claim 1, wherein, in response to determining the bandwidth of the at least one slot of the plurality of slots for wireless communication allocated in the multi-frequency superframe mode to the first protocol at the second frequency band, the second protocol at the second frequency band, or the third protocol at the second frequency band, the processing circuitry is further configured to:
reduce a bandwidth of at least one of the slot of the plurality of slots for wireless communication allocated in the multi-frequency superframe mode to the first protocol at the first frequency, the slot of the plurality of slots for wireless communication allocated in the multi-frequency superframe mode to the second protocol at the first frequency band, and the slot of the plurality of slots for wireless communication allocated in the multi-frequency superframe mode to the third protocol at the first frequency.

7. The apparatus of claim 6, wherein the processing circuitry is configured to reduce the bandwidth of at least one of the slot of the plurality of slots for wireless communication allocated in the multi-frequency superframe mode to the first protocol at the first frequency, the slot of the plurality of slots for wireless communication allocated in the multi-frequency superframe mode to the second protocol at the first frequency band, and the slot of the plurality of slots for wireless communication allocated in the multi-frequency superframe mode to the third protocol at the first frequency by an extent corresponding to the bandwidth as determined to correspond to the data size notification.

8. The apparatus of claim 1, wherein the first protocol comprises a local area networking protocol, the second protocol comprises a low-power wireless connection protocol, and the third protocol comprises a high-bandwidth connection protocol.

9. The apparatus of claim 8, wherein the first protocol comprises Wi-Fi, the second protocol comprises IEEE 802.15.4, and the third protocol comprises BLUETOOTH.

10. The apparatus of claim 1, wherein the first frequency band is a 2.4 GHz band, and wherein the second frequency band is a sub 1 GHz band.

11. A method comprising the steps of:
outputting, by processing circuitry, to a plurality of devices, a first superframe configured in an initial superframe mode, the initial superframe mode allocating each slot of a plurality of slots for wireless communication to a first protocol at a first frequency band, a second protocol at the first frequency band, or a third protocol at the first frequency band, wherein the first protocol, the second protocol, and the third protocol are different from each other;
determining a presence of a device of the plurality of devices capable of wireless communication using a second frequency band;
receiving a data size notification from the device of the plurality of devices capable of wireless communication using the second frequency band; and
in response to determining the presence of the device of the plurality of devices capable of wireless communication using the second frequency band, outputting, by processing circuitry, to the plurality of devices, a second superframe configured in a multi-frequency superframe mode, the multi-frequency superframe mode allocating: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at the second frequency band, the second protocol at the second frequency band, or the third protocol at the second frequency band, wherein the second frequency band is different than the first frequency band,
wherein, in response to receiving the data size notification, determining, by the processing circuitry, a bandwidth, corresponding to the data size notification, of the at least one slot of the plurality of slots for wireless communication allocated in the multi-frequency superframe mode to the first protocol at the second frequency band, the second protocol at the second frequency band, or the third protocol at the second frequency band.

12. The method of claim 11,
wherein outputting the first superframe comprises outputting, by the processing circuitry, a beacon indicating a starting of the first superframe and indicating a group number assigned to each device of the plurality of devices, and
wherein outputting the second superframe comprises outputting, by the processing circuitry, a second beacon indicating a starting of the second superframe and indicating the group number assigned to each device of the plurality of devices.

13. The method of claim 11, wherein determining, by the processing circuitry, the presence of the device of the plurality of devices capable of wireless communication using the second frequency band includes using a second frequency band notification received from the device of the plurality of devices capable of wireless communication using the second frequency band.

14. The method of claim 13, wherein the second frequency band notification is received from the device of the plurality of devices capable of wireless communication using the second frequency band via a slot of the plurality of slots of the initial superframe using one of the first protocol at the first frequency band, the second protocol at the first frequency band, or the third protocol at the first frequency band.

15. A system comprising:
a plurality of sensor devices; and
a hub device in communication with the plurality of sensor devices, the hub device comprising processing circuitry configured to:
output, to the plurality of sensor devices, a first superframe configured in an initial superframe mode, the initial superframe mode allocating each slot of a plurality of slots for wireless communication to a first protocol at a first frequency band, a second protocol at the first frequency band, or a third protocol at the first frequency band, wherein the first protocol, the second protocol, and the third protocol are different from each other;
determine a presence of a device of the plurality of devices capable of wireless communication using a second frequency band;
receive a data size notification from the device of the plurality of devices capable of wireless communication using the second frequency band;
in response to determining the presence of the device of the plurality of devices capable of wireless communication using the second frequency band, output, to the plurality of sensor devices, a second superframe configured in a multi-frequency superframe mode, the multi-frequency superframe mode allocating: i) at least one slot of a plurality of slots for wireless communication to the first protocol at the first frequency band, the second protocol at the first frequency band, or the third protocol at the first frequency band, and ii) at least one slot of the plurality of slots for wireless communication to the first protocol at the second frequency band, the second protocol at the second frequency band, or the third protocol at the second frequency band, wherein the second frequency band is different than the first frequency band, wherein, in response to receiving the data size notification, the processing circuitry is configured to determine a bandwidth, corresponding to the data size notification, of the at least one slot of the plurality of slots for wireless communication allocated in the multi-frequency superframe mode to the first protocol at the second frequency band, the second protocol at the second frequency band, or the third protocol at the second frequency band.

16. The system of claim 15, wherein, to output the first superframe, the processing circuitry is configured to output a beacon indicating a starting of the first superframe and indicating a group number assigned to each device of the plurality of devices; and wherein, to output the second superframe, the processing circuitry is configured to output a second beacon indicating a starting of the second superframe and indicating the group number assigned to each device of the plurality of devices.

* * * * *